United States Patent
Samuel et al.

(10) Patent No.: US 11,284,462 B2
(45) Date of Patent: Mar. 22, 2022

(54) TECHNIQUES FOR PROVIDING A THIRD GENERATION PARTNERSHIP PROJECT (3GPP) FABRIC ANCHOR FOR AN ENTERPRISE FABRIC

(71) Applicant: Cisco Technology, Inc., San Jose, CA (US)

(72) Inventors: Louis Gwyn Samuel, Swindon (GB); Srinath Gundavelli, San Jose, CA (US); Oliver James Bull, Bristol (GB); Mark Grayson, Maidenhead (GB); Sangram Kishore Lakkaraju, Bangalore (IN); Shree N. Murthy, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 79 days.

(21) Appl. No.: 16/717,384

(22) Filed: Dec. 17, 2019

(65) Prior Publication Data

US 2021/0185752 A1     Jun. 17, 2021

(51) Int. Cl.
*H04L 12/46* (2006.01)
*H04W 76/16* (2018.01)
(Continued)

(52) U.S. Cl.
CPC ......... *H04W 76/16* (2018.02); *H04L 12/4633* (2013.01); *H04L 12/4641* (2013.01);
(Continued)

(58) Field of Classification Search
None
See application file for complete search history.

(56) References Cited

U.S. PATENT DOCUMENTS 8,578,035 B2   11/2013  Miklos et al.
9,473,986 B2   10/2016  Tomici et al.
(Continued)

FOREIGN PATENT DOCUMENTS

EP    3215953 B1    9/2017
WO    2012025031 A1    3/2012
(Continued)

OTHER PUBLICATIONS

International Search Report and Written Opinion in counterpart International Application No. PCT/US2020/064175, dated Mar. 29, 2021, 15 pages.
(Continued)

*Primary Examiner* — Jenkey Van
(74) *Attorney, Agent, or Firm* — Edell, Shapiro & Finnan, LLC

(57) ABSTRACT

Techniques are described for integrating cellular access within an enterprise fabric. In one example, a method includes obtaining, by a cellular termination function via a cellular access point, a request from a client for data plane connectivity via a network, wherein the cellular access point is registered within the network and is in communication with a first switch of the network; obtaining, by the cellular termination function, cellular policy information and enterprise policy information for the client; obtaining, by the cellular termination function, an Internet Protocol (IP) address for the client; and establishing data plane connectivity for the client with the network via the cellular access point, the first switch of the network, and a second switch of the network based, at least in part, on the IP address for the client, wherein the second switch connects the network with one or more data networks.

20 Claims, 19 Drawing Sheets

(51) Int. Cl.
*H04W 76/12* (2018.01)
*H04W 76/11* (2018.01)
*H04W 8/08* (2009.01)
*H04W 60/00* (2009.01)
*H04W 80/02* (2009.01)

(52) U.S. Cl.
CPC ............. *H04W 8/08* (2013.01); *H04W 60/00* (2013.01); *H04W 76/11* (2018.02); *H04W 76/12* (2018.02); *H04W 80/02* (2013.01)

(56) References Cited

U.S. PATENT DOCUMENTS

| | | | |
|---|---|---|---|
| 9,838,314 | B1 | 12/2017 | Hooda et al. |
| 10,298,774 | B2 | 5/2019 | Russell et al. |
| 10,448,352 | B1* | 10/2019 | Grayson ............... H04W 60/04 |
| 10,791,535 | B1 | 9/2020 | Grayson et al. |
| 10,812,377 | B2 | 10/2020 | Stammers et al. |
| 2013/0265997 | A1* | 10/2013 | Gu .................... H04W 36/0066 370/338 |
| 2015/0117256 | A1 | 4/2015 | Sabaa et al. |
| 2015/0245249 | A1 | 8/2015 | Grootwassink et al. |
| 2016/0037328 | A1 | 2/2016 | Raveendran |
| 2016/0212778 | A1 | 7/2016 | Grootwassink et al. |
| 2016/0227467 | A1 | 8/2016 | Tomici et al. |
| 2016/0227471 | A1 | 8/2016 | De Foy et al. |
| 2016/0302110 | A1 | 10/2016 | Baboescu et al. |
| 2017/0366401 | A1 | 12/2017 | Jiang et al. |
| 2018/0091471 | A1 | 3/2018 | Hooda et al. |
| 2018/0097722 | A1 | 4/2018 | Callard |
| 2018/0098265 | A1 | 4/2018 | Tomici et al. |
| 2019/0268973 | A1 | 8/2019 | Bull et al. |
| 2020/0092423 | A1 | 3/2020 | Qiao et al. |
| 2020/0120022 | A1 | 4/2020 | Stammers et al. |
| 2020/0288424 | A1* | 9/2020 | Grayson ................. H04W 8/20 |
| 2020/0344662 | A1 | 10/2020 | Maino et al. |
| 2020/0366677 | A1 | 11/2020 | Draznin et al. |
| 2021/0045193 | A1 | 2/2021 | Mishra et al. |
| 2021/0194728 | A1 | 6/2021 | Gundavelli et al. |

FOREIGN PATENT DOCUMENTS

| | | |
|---|---|---|
| WO | 2015038911 A1 | 3/2015 |
| WO | 2019125843 A1 | 6/2019 |
| WO | 2020040752 A1 | 2/2020 |
| WO | 2020046380 A1 | 3/2020 |
| WO | 2020148062 A1 | 7/2020 |
| WO | 2021017669 A1 | 2/2021 |

OTHER PUBLICATIONS

3GPP, "3rd Generation Partnership Project; Technical Specification Group Core Network and Terminals; Non-Access-Stratum (NAS) protocol for Evolved Packet System (EPS); Stage 3 (Release 13)", 3GPP TS 24.301 V13.7.0, Sep. 2016, 458 pages.
3GPP Organizational Partners, "3rd Generation Partnership Project; Technical Specification Group Services and System Aspects; Local IP Access and Selected IP Traffic Offload (LIPA-SIPTO) (Release 10)", 3GPP TR 23.829 V10.0.1, Oct. 2011, 43 pages.
Cisco, "Evolved Packet Data Gateway Overview", ePDG Administration Guide, StarOS Release 20, downloaded Jan. 22, 2019, 90 pages.
Craig Hill et al., Cisco, "Cisco Software-Defined Access Enabling Intent-based Networking", downloaded Jan. 22, 2019, 154 pages.
European Telecommunications Standards Institute, "Digital cellular telecommunications system (Phase 2+); Universal Mobile Telecommunications System (UMTS); LTE; Circuit Switched (CS) fallback in Evolved Packet System (EPS) Stage 2 (3GPP TS 23.272 version 8.2.0 Release 8)", ETSI TS 123 272 V8.2.0, Jan. 2009, 48 pages.
3GPP, "3rd Generation Partnership Project; Technical Specification Group Radio Access Network; Evolved Universal Terrestrial Radio Access Network (E-UTRAN); Architecture description (Release 15)", 3GPP TS 36.401 V15.1.0, Dec. 2018, 21 pages.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.6.0, Jun. 2019, 365 pages.
Cisco, "Software-Defined Access 1.0", C11-740585-00, May 2018, 35 pages.
Wikipedia, "Virtual Extensible LAN", Aug. 7, 2019, https://en.wikipedia.org/wiki/Virtual_Extensible_LAN, 2 pages.
ScienceDirect, "Temporary Identity", https://www.sciencedirect.com/topics/computer-science/temporary-identity, downloaded Dec. 13, 2019, 16 pages.
Cisco, "Software-Defined Access Wireless", https://www.cisco.com/c/en/us/td/docs/wireless/controller/8-5/config-guide/b_cg85/fabric_enabled_wireless.pdf, downloaded Dec. 13, 2019, 12 pages.
V. Fuller et al., "Locator/ID Separation Protocol (LISP) Map-Server Interface", Internet Engineering Task Force (IETF), Request for Comments: 6833, Category: Experimental, ISSN: 2070-1721, Jan. 2013, 13 pages.
D. Farinacci et al., "The Locator/ID Separation Protocol (LISP)", Internet Engineering Task Force (IETF), Request for Comments: 6830, Category: Experimental, ISSN: 2070-1721, Jan. 2013, 75 pages.
J. Arkko et al., "Improved Extensible Authentication Protocol Method for 3rd Generation Authentication and Key Agreement (EAP-AKA)", Network Working Group, Request for Comments: 5448, Updates: 4187, Category Informational, May 2009, 29 pages.
P. Calhoun, ED. et al., "Control And Provisioning of Wireless Access Points (CAPWAP) Protocol Specification", Network Working Group, Request for Comments: 5415, Category: Standards Track, Mar. 2009, 155 pages.
B. Aboba et al., "The Network Access Identifier", Network Working Group, Request for Comments: 4282, Obsoletes 2486, Category: Standards Track, Dec. 2005, 16 pages.
J. Arkko et al., "Extensible Authentication Protocol Method for 3rd Generation Authentication and Key Agreement (EAP-AKA)", Network Working Group, Request for Comments: 4187, Category: Informational, Jan. 2006, 79 pages.
MAC Address format available at https://www.askapache.ceom/s/u.askapache.com/2009/11/MACaddress.png, downloaded Dec. 13, 2019, 1 page.
Cisco Systems, Inc., "Locator ID Separation Protocol (LISP) VM Mobility Solution", White Paper, Printed in USA C11-539588-03/28/11, https://www.cisco.com/c/dam/en/us/products/collateral/ios-nx-os-software/locator-id-separation-protocol-lisp/lisp-vm_mobility_wp.pdf, Dec. 13, 2019, 73 pages.
A. Rodriguez-Natal et al., "MS-originated SMRs", draft-rodrigueznatal-lisp-ms-smr-08, LISP Working Group, Internet-Draft, Intended status: Informational, Apr. 4, 2019, 7 pages.
M. Liebsch et al., "Quality-of-Service Option for Proxy Mobile IPv6", Internet Engineering Task Force (IETF), Request for Comments: 7222, Category: Standards Track, ISSN: 2070-1721, May 2014, 58 pages.
3GPP, "3rd Generation Partnership Project; Technical Specification Group Services and System Aspects; Policy and charging control architecture (Release 16)", 3GPP TS 23.203 V16.1.0, Jun. 2019, 263 pages.
GSM Association, "Guidelines for IPX Provider networks (Previously Inter-Service Provider IP Backbone Guidelines)", Version 14.0, Aug. 1, 2018, 52 pages.
S. Hanks et al., "Generic Routing Encapsulation (GRE)", Network Working Group, Request for Comments: 1701, Category: Informational, Oct. 1994, 8 pages.
D. Farinacci et al., "Generic Routing Encapsulation (GRE)", Network Working Group, Request for Comments: 2784, Category: Standards Track, Mar. 2000, 9 pages.
C. Perkins, "IP Encapsulation within IP", Network Working Group, Request for Comment: 2003, Category: Standards Track, Oct. 1996, 14 pages.

(56) References Cited

OTHER PUBLICATIONS

S. Gundavelli, ED. et al., "Proxy Mobile IPv6", Network Working Group, Request for Comments: 5213, Category: Standards Track, Aug. 2018, 92 pages.
R. Wakikawa et al., "IPv4 Support for Proxy Mobile IPv6", Internet Engineering Task Force (IETF), Request for Comments: 5844, Category: Standards Track, ISSN: 2070-1721, May 2010, 49 pages.
3GGP, "3rd Generation Partnership Project; Technical Specification Group Services and System Aspects; System Architecture for the 5G System (5GS); Stage 2 (Release 16)", 3GPP TS 23.501 V16.20.0, Sep. 2019, 391 pages.
3GPP, "3rd Generation Partnership Project; Technical Specification Group Core Network and Terminals; 5G System; Session Management Policy Control Service; Stage 3 (Release 16)", 3GPP TS 29.512 V16.2.0, Sep. 2019, 168 pages.
3GPP, "3rd Generation Partnership Project; Technical Specification Group Core Network and Terminals; 5G System; Network Function Repository Services; Stage 3 (Release 16)", 3GPP TS 29.510 V16.1.1, Oct. 2019, 150 pages.
3GPP, "3rd Generation Partnership Project; Technical Specification Group Core Network and Terminals; Interface between the Control Plane and the User Plane Nodes; Stage 3 (Release 16)", 3GPP TS 29.244 V16.1.0, Sep. 2019, 243 pages.
3GPP, "3rd Generation Partnership Project; Technical Specification Group Services and System Aspects; Policy and Charging Control Framework for the 5G System (5GS); Stage 2 (Release 16)", 3GPP TS 23.503 V16.2.0, Sep. 2019, 104 pages.
3GPP, "3rd Generation Partnership Project; Technical Specification Group Services and System Aspects; Procedures for the 5G System (5GS); Stage 2 (Release 16)", 3GPP TS 23.502 V16.2.0, Sep. 2019, 525 pages.
Cisco, "RADIUS Dictionaries and Attribute Definitions", downloaded Jul. 1, 2020, 358 pages.
Michael Geller, et al., "5G Security Innovation with Cisco", Cisco, Whitepaper, downloaded May 14, 2018, 29 pages.
Nokia, "7750 Service Router Virtualized Service Router", BNG Cups User Plane Function Guide Release 20.10.R1, Issue: 01, downloaded Oct. 26, 2020, 60 pages.
Jason Longley, et al., "Securing the 5G Core (5GC) and Evolved Packet Core (EPC) with Cisco Security", Cisco, White Paper, downloaded Jul. 20, 2020, 18 pages.
Solved, "Radius LDAP mapping for SGT", Cisco Community, downloaded Feb. 12, 2021, 5 pages.
"NetFlow Collector", Cisco NetFlow Collector Software, SolarWinds, downloaded Feb. 12, 2021, 6 pages.
M. Smith, et al., "Scalable-Group Tag eXchange Protocol (SXP) draft-smith-kandula-sxp-10", Network Working Group, Internet-Draft, May 24, 2020, 56 pages.
M. Smith, et al., "Scalable-Group Tag eXchange Protocol (SXP) draft-smith-kandula-sxp-07", Network Working Group, Internet-Draft, Apr. 3, 2019, 56 pages.
Cisco, "Overview of TrustSec", Ordering Guide, Jan. 2014, 58 pages.
S. Blake, et al., "An Architecture for Differentiated Services," Network Working Group, Request for Comments: 2475, Category: Informational, Dec. 1998, 36 pages.
F. Xia, et al., "Quality of Service Marking in Virtual eXtensible Local Area Network draft-xia-nvo3-vxlan-qosmarking-01.txt," Network Working Group, Internet-Draft, Nov. 10, 2014, 9 pages.
M. Mahalingam, et al., "Virtual eXtensible Local Area Network (VXLAN): A Framework for Overlaying Virtualized Layer 2 Networks over Layer 3 Networks," Independent Submission, Request for Comments: 7348, Category: Informational, ISSN: 2070-1721, Aug. 2014, 22 pages.
"VXLAN Overview: Cisco Nexus 9000 Series Switches," Cisco, White Paper, 2015, 10 pages.
"Virtual Extensible LAN and Ethernet Virtual Private Network," Cisco, Jan. 18, 2018, 48 pages.
Simone Arena, "SD-Access Wireless Integration," Cisco Live!, BRKEWN-2020, Mar. 6-9, 2018, 122 pages.
"HeNBGW Qci Dscp Mapping Table Configuration Mode Commands," Cisco, Command Line Interface Reference, Commands G—H, StarOS Release 20, Aug. 8, 2016, 8 pages.
"Configuring VXLAN QoS," Cisco, Aug. 13, 2019, 14 pages.
"Locator ID Separation Protocol (LISP) Overview," Cisco, IP Routing: LISP Configuration Guide, Cisco IOS Release 15M&T, Jan. 25, 2018 8 pages.
3GPP, "3rd Generation Partnership Project; Technical Specification Group Radio Access Network; UTRAN lub/lur interface user plane protocol for DCH data streams (Release 5)," 3GPP TS 25 427 V5.5 0, Jun. 2005, 34 pages.
3GPP, 3rd Generation Partnership Project; Technical Specification Group Core Network and Terminals; Policy and Charging Control (PCC); Reference points (Release 16), 3GPP TS 29.212 V16 0.0, Jun. 2019, 285 pages.

* cited by examiner

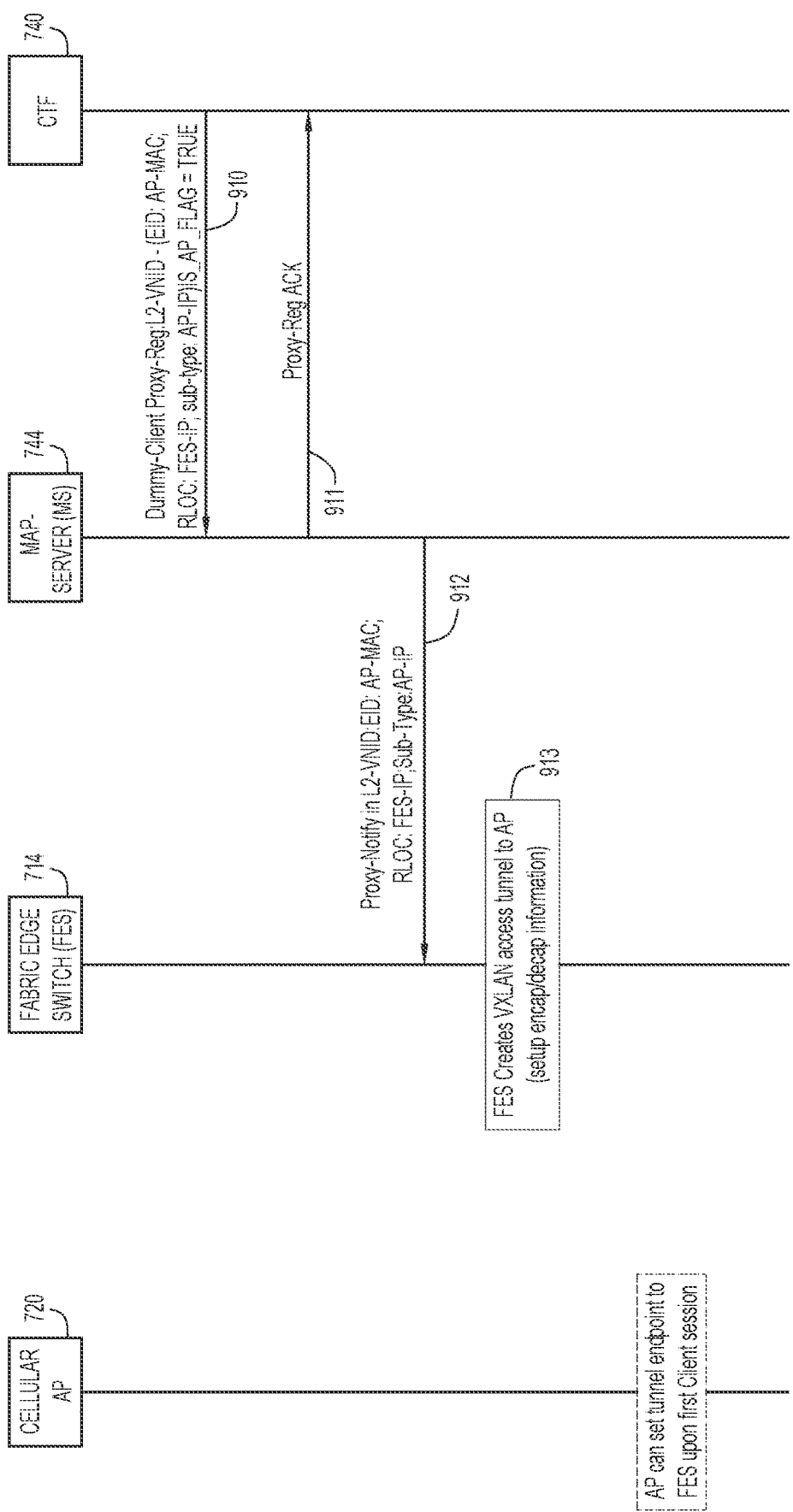

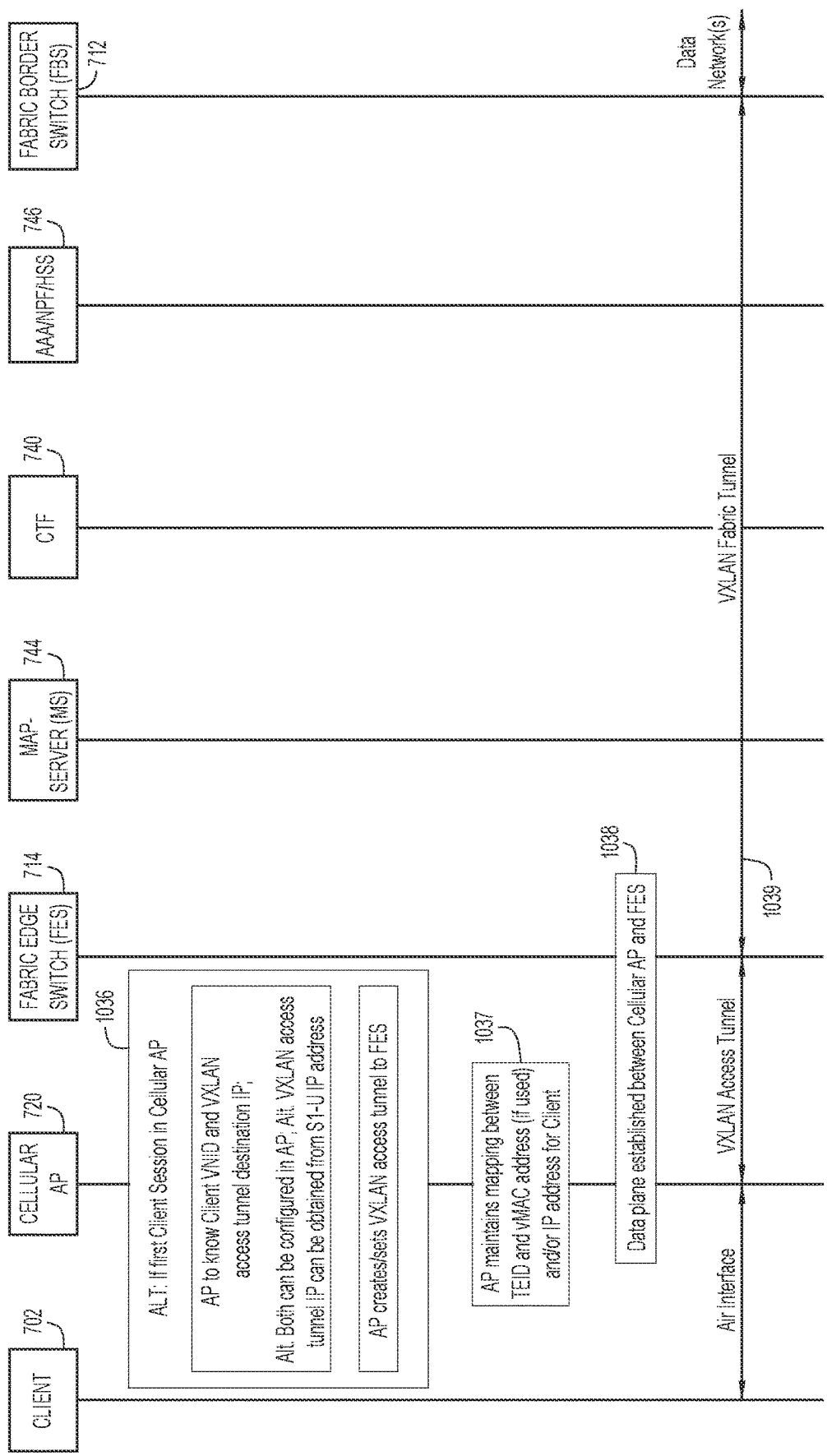

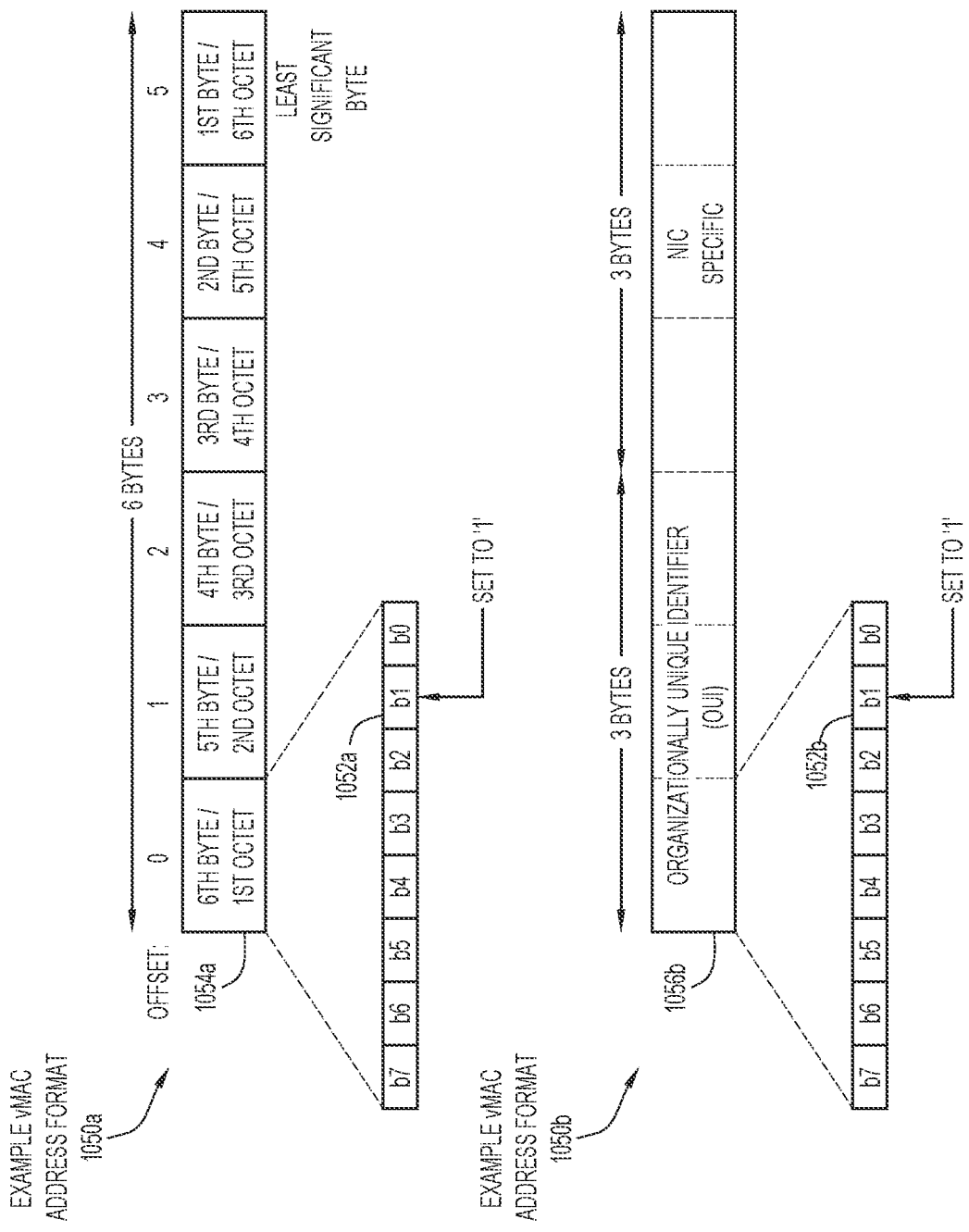

TECHNIQUES FOR PROVIDING A THIRD GENERATION PARTNERSHIP PROJECT (3GPP) FABRIC ANCHOR FOR AN ENTERPRISE FABRIC

TECHNICAL FIELD

The present disclosure relates to network equipment and services.

BACKGROUND

Networking architectures have grown increasingly complex in communications environments, particularly mobile networking environments. Mobile communication networks have grown substantially in subscriber base as end users become increasingly connected to mobile network environments. As the number of mobile subscribers increases, efficient management of communication resources becomes more critical. In particular, there are significant challenges related to providing 3rd Generation Partnership Project (3GPP) accesses within enterprise networking environments.

BRIEF DESCRIPTION OF THE DRAWINGS

FIGS. 9A and 9B are a message sequence diagram illustrating a flow for registering a cellular access point within the enterprise fabric for the system of FIG. 7, according to an example embodiment.

FIGS. 10A, 10B, 10C, and 10D are a message sequence diagram illustrating a call flow for providing cellular access to a client within the enterprise fabric for the system of FIG. 7, according to an example embodiment.

FIG. 10E is a schematic diagram illustrating example details that may be associated with example virtual Media Access Control (vMAC) address formats, according example embodiments.

DESCRIPTION OF EXAMPLE EMBODIMENTS

Overview

Figure 1:
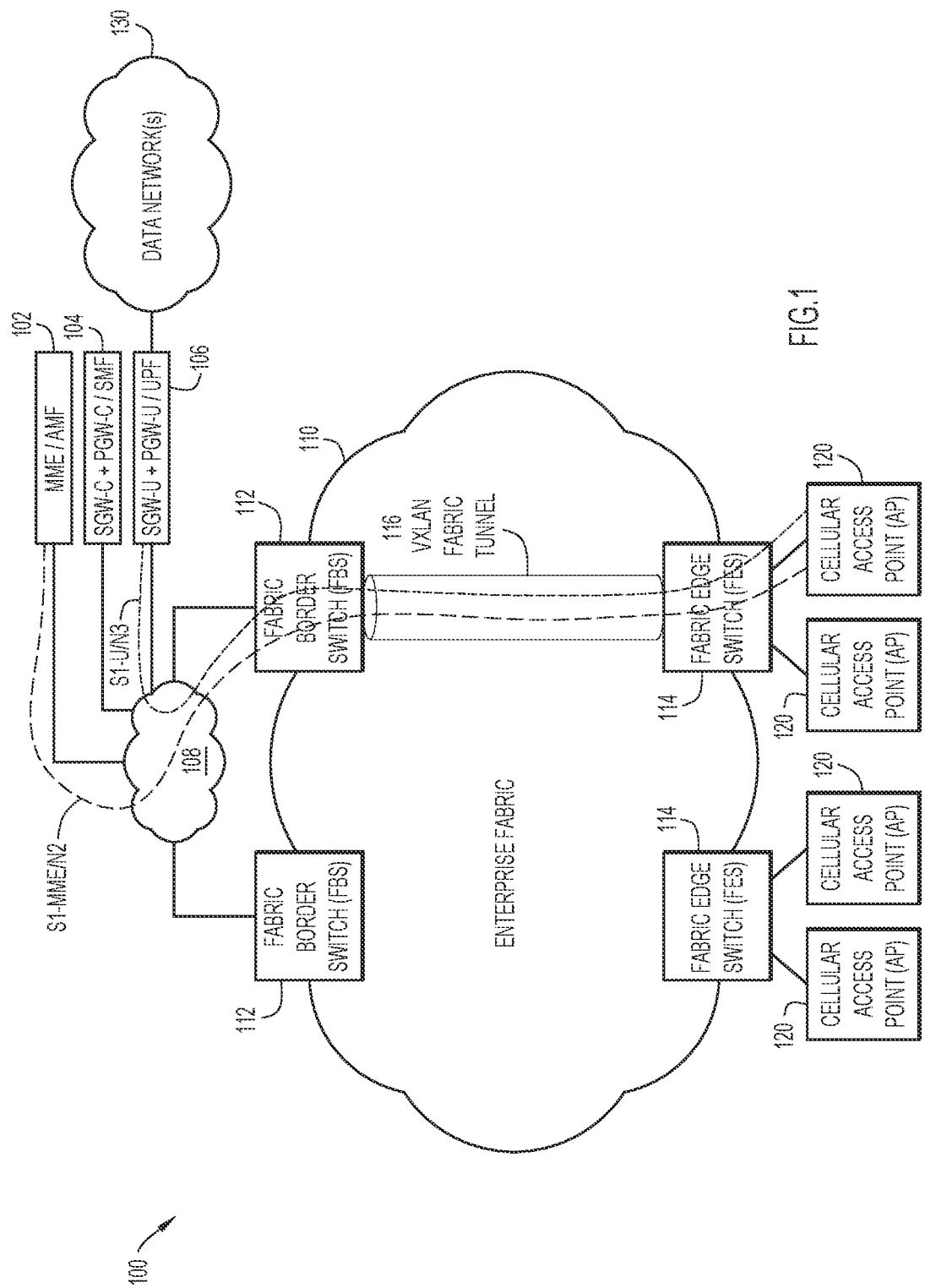
FIG. 1 is a block diagram of an example system in which techniques that provide for integrating cellular access into an enterprise fabric may be implemented, according to an example embodiment.

Techniques presented herein provide for the addition or integration of private Long Term Evolution (LTE)/5th Generation (5G) and Citizens Broadband Radio Service (CBRS) access methods into an enterprise fabric by enabling Virtual Extensible Local Area Network (VXLAN) and address allocation techniques into a cellular user plane anchor function, such as a cellular termination function (CTF) or the like, as discussed herein.

In an example embodiment, a method is provided that includes obtaining, by a cellular termination function via a cellular access point, a request from a client for data plane connectivity via a network, wherein the cellular access point is registered within the network and the cellular access point is in communication with a first switch of the network; obtaining, by the cellular termination function, cellular policy information and enterprise policy information for the client based on one or more client identifiers; obtaining, by the cellular termination function, an Internet Protocol address for the client; and establishing data plane connectivity for the client with the network via the cellular access point, the first switch of the network, and a second switch of the network based, at least in part, on the IP address for the client, wherein the second switch connects the network with one or more data networks.

EXAMPLE EMBODIMENTS

The introduction of a Locator/Identity (ID) Separation Protocol (LISP)/Virtual Extensible Local Area Network (VXLAN) enterprise fabric, which may employ software-defined access (SDA), together with fabric mode or fabric enabled wireless local area network (WLAN) (e.g., Wi-Fi®) access points that support VXLAN has created a unified fabric for wired and wireless access. With the introduction of cellular access technologies such as private LTE/5G and CBRS access technologies, it may be highly advantageous to include these into the fabric to align fabric policies and traffic management with the new access functions as well as to leverage Internet Protocol (IP) mobility support that the fabric can support using LISP.

A LISP/VXLAN software-defined access (SDA) wireless fabric with policy classification at the access point (AP) is a foundation of SDA and enterprise fabric networking. This unifies policy across the enterprise access and network together with enhanced segmentation for traffic management. The inclusion of cellular based access methods (e.g., private LTE/5G, CBRS, etc.) into an enterprise fabric drives a new need for integrating these technologies into the fabric.

Presented herein are techniques that provide for the addition of private cellular access methods such as private Long Term Evolution (LTE)/5G and CBRS access methods into an enterprise fabric by enabling VXLAN and address allocation techniques into a cellular user plane anchor function of a cellular-based system, such as a cellular termination function (CTF) or the like, as discussed in further detail below. In various implementations, existing WLAN (e.g., Wi-Fi®) AP integrations within the enterprise fabric can be leveraged and applied to the cellular user plane anchor function of the cellular-based system.

As with wireless LAN controller (WLC) solutions, there are multiple options for integrating a cellular-based access system into an enterprise fabric. Various example systems in which techniques for integrating cellular access into an enterprise fabric may be implemented are discussed below with reference to FIGS. 1, 2, 3, 4, 5, and 7, in accordance with various example embodiments.

As referred to herein, the terms 'access', 'access type', and variations thereof that may be used with reference to various network architectures presented herein may refer to wired accesses/access types (e.g., Ethernet) and wireless or over-the-air Radio Frequency (RF) accesses/access types (also sometimes referred to as Radio Access Technology (RAT) types) such as, but not limited to: non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; cellular accesses such as 3GPP licensed spectrum accesses (e.g., 3rd Generation (3G), 4th Generation (4G)/LTE, 5G, and/or next Generation (nG) accesses) and/or 3GPP unlicensed spectrum accesses (e.g., Licensed-Assisted Access (LAA), enhanced LAA (eLAA), further enhanced LAA (feLAA), and New Radio Unlicensed (NR-U)); Citizen Broadband Radio Service (CBRS) accesses; combinations thereof; and/or the like.

Further as referred to herein, the term 'cellular' may refer to any licensed spectrum access type or combination thereof (e.g., 3GPP-based, CBRS-based, etc.). Additionally, the terms 'WLAN' (wireless local area network) and 'Wi-Fi®' may be used interchangeably; however, the term 'WLAN' may also be inclusive of any other unlicensed spectrum access type or combination thereof (e.g., IEEE 802-based access types, NFC, Bluetooth®, etc.). Accordingly, although techniques described herein are discussed with reference to cellular and WLAN accesses/access types, discussions of these particular accesses are not meant to limit the broad scope of the present disclosure. Techniques described herein may be implemented for virtually any combination or number of wired and/or non-wired/air interface (e.g., cellular, WLAN, etc.) accesses/access types and, thus, are clearly within the scope of the present disclosure.

Referring to FIG. 1, FIG. 1 is a block diagram of an example system 100 in which techniques that provide for integrating cellular access into an enterprise fabric may be implemented, according to an example embodiment.

For system 100, cellular access may be integrated into an enterprise fabric 110 via a cellular access system that may include 3GPP network elements, such as any combination of a 4G/LTE Mobility Management Entity (MME) and/or a 5G Access and Mobility Management Function (AMF) 102 (referred to herein as MME/AMF 102), any combination of a 4G Control and User Plane (CUPS) control plane (CP) Serving Gateway (SGW-C) plus a CP Packet Data Network (PDN) Gateway (PGW-C) and/or a 5G Session Management Function (SMF) 104 (referred to herein as SGW-C+PGW-C/SMF 104), any combination of a 4G user plane (UP) SGW (SGW-U) plus a UP PGW (PGW-U) and/or a 5G user plane function (UPF) 106 (referred to herein as SGW-U+PGW-U/UPF 106), and one or more cellular access points (APs), such as cellular AP 120 (which may be inclusive of a CBRS variant cellular AP). MME/AMF 102, SGW-C+PGW-C/SMF 104, and SGW-U+PGW-U/UPF 106 may be interconnected with one or more fabric edge switch(es) of enterprise fabric 110 via a network 108, which may be implemented as any network now known or hereafter developed. In various implementations, SGW-U+PGW-U/UPF 106 may provide user data plane connectivity to one or more data network(s) 130 for one or more clients (not shown in FIG. 1 for simplicity) that may be attached to cellular AP(s) 120. In various embodiments, data network(s) 130 may be any combination of a wide area network (WAN), the Internet, an Internet Protocol (IP) Multimedia Subsystem (IMS), an Ethernet network, Ethernet switching system(s), an enterprise data center, and/or the like. As referred to herein, a 'client' may be a user equipment (UE), user, device, or the like.

Generally for a 4G CUPS architecture, as may be prescribed by 3GPP standards, the MME, SGW-C, and PGW-C manipulate the user plane infrastructure (e.g., SGW-U+PGW-U) to facilitate cellular-based connectivity between a client attached to a cellular AP and one or more data networks 130. The user plane SGW-U+PGW-U can process and perform operations on cellular-based client traffic passing through user plane infrastructure. In some embodiments, a SGW-C+PGW-C may be implemented as combined user plane System Architecture Evolution (SAE) gateway (SAEGW-C) and a SGW-U+PGW-U may be implemented as a SAEGW-U.

Generally for a 5G architecture, as may be prescribed by 3GPP standards, The AMF provides authentication, authorization, and mobility management for mobile devices, while the SMF is generally responsible for session management with individual functions being supported on a per-session basis in which the SMF allocates IP addresses to clients and selects and controls the UPFs for data transfer for cellular-based access. In general terms, MME/AMF 102 may be considered a cellular termination function, which in some instances, may also include some functionality of an SMF. Other details associated with a cellular termination function are discussed herein with reference at least to FIG. 7.

In general, cellular AP 120 may terminate a cellular (e.g., LTE/5G) air interface and may be configured with appropriate hardware (e.g., processor(s), memory element(s), antennas and/or antenna arrays, baseband processors (modems), and/or the like), software, logic, and/or the like to provide over-the-air coverage for a private cellular access network (e.g., private 4G/LTE, private 5G, private CBRS, etc.). By 'private' it is meant that a private cellular access network provides network connectivity/services to clients (e.g., users/devices/etc.) served by a network operator and/or service provider of the private cellular access network, such as an enterprise. In one example, a private cellular access network may be considered to be a network that may be implemented to serve enterprise purposes (e.g., business purposes, government purposes, educational purposes, etc.) for enterprise clients (e.g., enterprise users/devices/etc.) in which the private cellular access network may be operated by any combination of traditional mobile network operators/ service providers (e.g., AT&T®, Verizon®, etc.), enterprises network operators/service providers (e.g., Cisco®, etc.), and/or third party network operators/service providers (e.g., neutral host network operators/service providers, cloud service providers, etc.). Cisco is a registered trademark of Cisco Technology, Inc.

In various embodiments, cellular AP 120 may be implemented as any combination of an evolved Node B (eNB or eNodeB) to facilitate 4G/LTE air accesses, a next generation Node B (gNB or gNodeB) to facilitate 5G air accesses, a next generation (nG) radio to facilitate any next Generation air accesses, a CBRS device (CBSD) to facilitate CBRS accesses, and/or the like now known here or hereafter developed.

For various examples described herein, various information/data associated with services, security, quality, etc. provided/enforced for client (e.g., user equipment (UE), user, device, etc.) network data connectivity may be discussed interchangeably using the term 'policy' (e.g., enterprise policy, etc.). Generally, as referred to herein, a 'policy' can represent a collection of intent or goals, sometimes characterized as 'rules' (e.g., access type/location/etc. authorization rules, Quality of Service (QoS) rules, QoS Class Identifier (QCI), security rules, etc.), through which application of the policy (e.g., rules of the policy) can be utilized to realize the intent or goals of the policy.

An enterprise fabric, such as enterprise fabric 110 may employ a software-defined access (SDA) and may represent a programmable network that provides software-based policy and segmentation from an edge of the enterprise fabric to applications/devices/nodes/etc. external to the enterprise fabric that utilizes the enterprise fabric for end-to-end connectivity. As referred to herein, the terms 'enterprise fabric', 'enterprise IP fabric', 'enterprise network fabric,' 'SDA/enterprise fabric,' and variations thereof may be used interchangeably to refer to an enterprise fabric, such as enterprise fabric 110, which may employ SDA to facilitate end-to-end network connectivity for multiple accesses via the enterprise fabric. Thus, enterprise fabric 110 may also be referred to herein as SDA/enterprise fabric 110.

An enterprise fabric, such as enterprise fabric 110 and any other enterprise fabric discussed herein, may be access-agnostic and may provide end-to-end connectivity for any access type and/or combination of access types (e.g., wired, cellular, Wi-Fi®, etc.). Thus, although only cellular APs 120 are illustrated in FIG. 1, it is to be understood that fabric edge switch 114 may provide connectivity to multiple types of access points (e.g., any combination of cellular, Wi-Fi, etc. APs), combined access points (e.g., combined cellular/Wi-Fi access points), and/or the like.

An enterprise fabric, such as enterprise fabric 110, may span different geographic enterprise locations (or sites), such as a main campus, remote branches, and so on, each with multiple devices, services, and/or policies in order to serve enterprise purposes (e.g., business purpose, government purpose, educational/university purpose, etc.) of an enterprise entity. Accordingly, an enterprise fabric, such as enterprise fabric 110 and/or any other enterprise fabric discussed herein provides an end-to-end architecture that ensures consistency in terms of connectivity, segmentation, and policy across the different locations of an enterprise.

For enterprise fabric 110, fabric border switch 112 and fabric edge switch 114 may be considered Layer 2 (L2)/Layer 3 (L3) switches/routers for the enterprise fabric. An edge switch, such as fabric edge switch 114, may be provided on an edge of the enterprise fabric 110 to provide connectivity to one or more access points, such as cellular AP 120. A border switch, such as fabric border switch 112, facilitates connectivity of a fabric domain, such as enterprise fabric 110 to external networks, such as wide area networks (WANs), which may be inclusive of network 108 that, in some implementations may overlap in whole or in part with data network(s) 130. In some instances, a fabric border switch can also be referred to as a fabric border node or simply a border node (BN) and a fabric edge switch may be referred to interchangeably as a fabric edge node. Fabric border switch 112, fabric edge switch 114, and/or any other data plane nodes of enterprise fabric 110 may operate as points of policy enforcement for enterprise fabric 110. That is, fabric border switch 112 and fabric edge switch 114 may enforce enterprise fabric policy on traffic flowing through the enterprise fabric between one or more client(s) and one or more external network(s), element(s), application(s), etc.

In at least one implementation, enterprise fabric 110 may include an overlay network, such as a Virtual Extensible Local Area Network (VXLAN or VxLAN) overlay network, built on top of an underlay network. The VXLAN overlay network may facilitate tunneling for the user plane of enterprise fabric 110. Although embodiments herein provide example details associated with VXLAN, other tunneling protocols may be implemented for enterprise fabric 110 including, but not limited to, Generic Routing Encapsulation (GRE) (as may be prescribed at least by Internet Engineering Task Force (IETF) Request For Comments (RFC) 1701 and 2784), IP-in-IP (as may be prescribed at least by RFC 2003), IP-in-UDP, among others.

In at least one embodiment, a tunneling protocol, such as VXLAN, may be implemented using Locator/ID Separation Protocol (LISP) for enterprise fabric 110 to facilitate IP mobility for the enterprise fabric 110, as discussed in further detail herein. Generally, LISP is a control plane protocol that provides for managing the mobility for an endpoint (e.g., client 102). The LISP control plane can be used between forwarding plane elements (e.g., SW 114 and BN 112) and a LISP Map-Server (not shown) for managing the mobility state related to a client. Although embodiments herein provide example details associated with a LISP implementation, other control plane protocols may be implemented for enterprise fabric 110 including, but not limited to, Proxy Mobile IPv6 (as may be prescribed at least by RFC 5213 and 5844), Identifier Locator Addressing (ILA), among others.

A LISP implementation, as prescribed at least by Internet Engineering Task Force (IETF) Request For Comments (RFC) 6830, RFC 6833, etc. may utilize various constructs including Routing Locators (RLOCs) that may be associated with edge and border switches (e.g., fabric edge switch 114 and fabric border switch 112) and endpoint identifiers (EIDs) that may be associated with/identify clients and/or other endpoints (e.g., APs, etc.) in order to facilitate mobility for enterprise fabric 110. An RLOC is an IP address associated with an element in which the nomenclature 'RLOC=element' may generally represent an RLOC set to the IP address of the element. Other variations for setting an RLOC can be envisioned using, for example, Type-Length-Value (TLV) expressions, or the like. IP addresses as discussed for embodiments described herein may be implemented as IP version 4 (IPv4) and/or IP version 6 (IPv6) addresses.

Per a LISP architecture implementation, edge and border switches may be considered ingress/egress tunnel routers (TRs) that may provide ingress and egress tunnel routing operations to facilitate network communications and may be referred to as 'xTRs' (e.g., ingress/egress TRs) or proxy 'xTRs' (PxTRs) configured to provide xTR functionality (e.g., ingress/egress routing functionality). In one instance, a VXLAN fabric tunnel, such as VXLAN fabric tunnel 116 may be implemented using LISP between fabric edge switch 114 and fabric border switch 112 to provide data plane network connectivity across enterprise fabric 110 (e.g., for forwarding traffic flows for the client across enterprise fabric 110). A full mesh of VXLAN fabric tunnels may be implemented between various fabric border switches and fabric edge switches of an enterprise fabric. Other LISP implementation features are discussed in further detail herein below at least with reference to the system illustrated in FIG. 7.

For the example of FIG. 1, the cellular system may be implemented fully over-the-top (OTT) as a user of enterprise fabric 110 but not integrated into the fabric. For system 100, the Internet Protocol (IP) address of a client connecting to the fabric via cellular AP 120 may be allocated through an external Dynamic Host Configuration Protocol (DHCP) server or service (not shown) or configured Access Point Name (APN)/Data Network Name (DNN) IP pool and appears as an external entity to the enterprise fabric 110. 3GPP S1-MME/N2 interface communications (as may be prescribed by 3GPP standards) between MME/AMF 102 and cellular AP 120 and also 3GPP S1-U/N3 interface communications (as may be prescribed by 3GPP standards) between SGW-U+PGW-U/UPF may be facilitated via fabric border switch 112 and fabric edge switch 114 of enterprise fabric 110.

Figure 2:
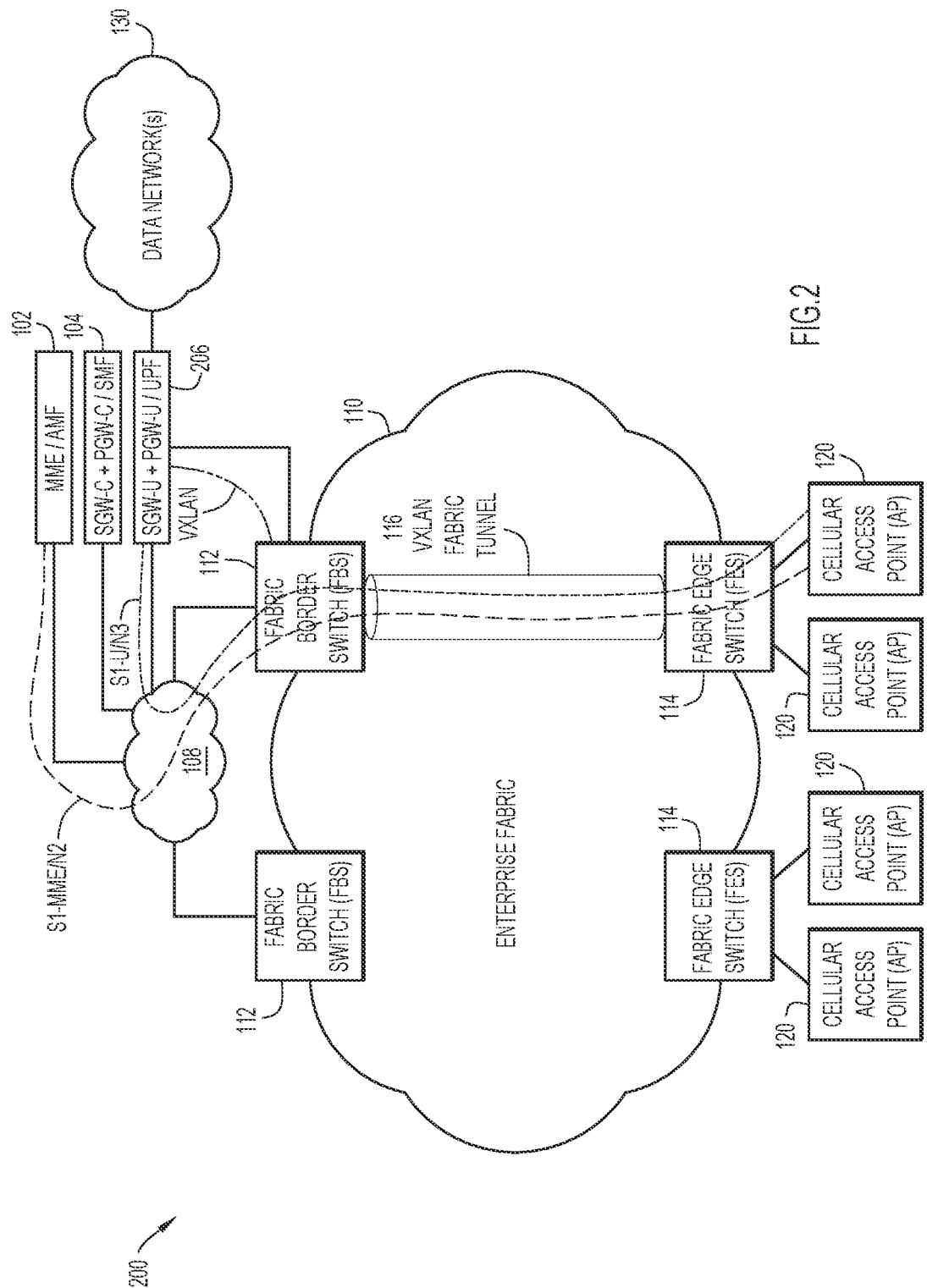
FIG. 2 is a block diagram of another example system in which techniques that provide for integrating cellular access into an enterprise fabric may be implemented, according to an example embodiment.

Referring to FIG. 2, FIG. 2 is a block diagram of another example system 200 in which techniques that provide for integrating cellular access into an enterprise fabric may be implemented, according to an example embodiment. System 200 may be configured similar to system 100 of FIG. 1 except that system 200 may provide a cellular fabric border implementation including a fabric-enabled PGW-U+SGW-U/UPF 206 in that PGW-U+SGW-U/UPF 206 includes interworking into the VXLAN data plane, as illustrated via example protocol stacks, discussed for FIG. 6, herein.

Further, for system 200, the IP address of a client (e.g., UE, etc.) connecting to the fabric via cellular AP 120 may be allocated via SGW-C+PGW-C/SMF 104 through MME 102.

Figure 3:
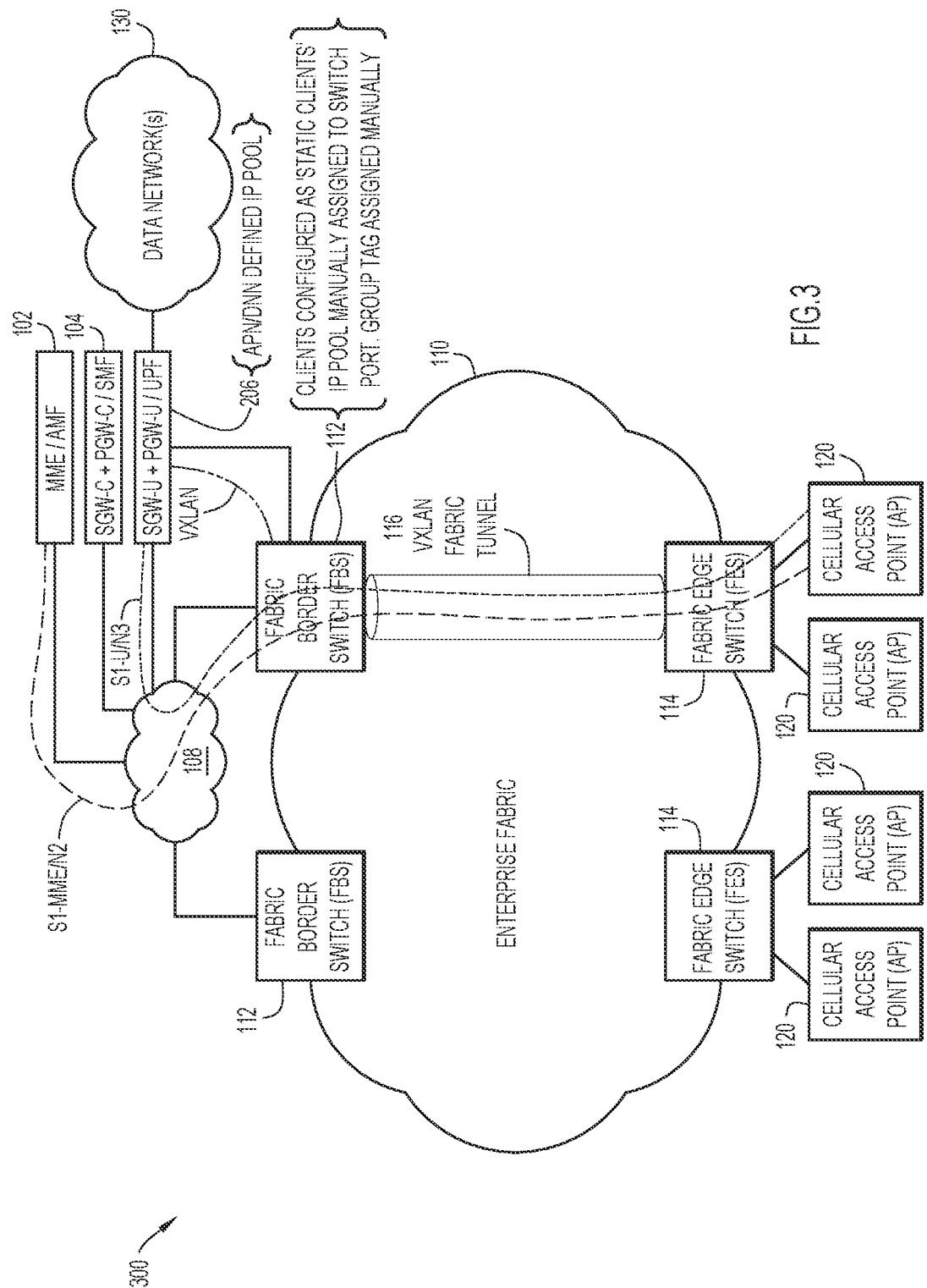
FIG. 3 is a block diagram of another example system in which techniques that provide for integrating cellular access into an enterprise fabric may be implemented, according to an example embodiment.

Referring to FIG. 3, FIG. 3 is a block diagram of another example system 300 in which techniques that provide for integrating cellular access into an enterprise fabric may be implemented, according to an example embodiment. System 300 may be configured similar to system 200 providing a cellular fabric border implementation including fabric-enabled SGW-U+PGW-U/UPF 206 that includes interworking into the VXLAN data plane. However, for system 300, clients (e.g., UEs, etc.) are configured as 'static clients' in that the IP address of a client connecting to the fabric via cellular AP is configured from a pre-determined or defined IP pool allocated to an APN/DNN. Defined IP pool(s) are linked to specific fabric border switch 112 ports and mapped to preconfigured enterprise group tags or group indicators.

Generally, enterprise group tags or indicators may be used to identify security information, policy information, access information, authorization information, etc. for different client groups (e.g., employees, types/classes/ranks of employees, types/classes/ranks of network devices (e.g., print devices, storage devices, primary/backup devices, etc.), or the like) that may connect to an enterprise fabric provided by an enterprise. Group tags may be associated with a group access control list (ACL), which can be used to enforce enterprise policy within enterprise fabric 110 (e.g., via fabric edge switch 114). In some implementations, enterprise group tags may be implemented as Cisco® Scalable or security group tags (SGTs) in association with a security or scalable group access control list (SGACL).

Figure 4:
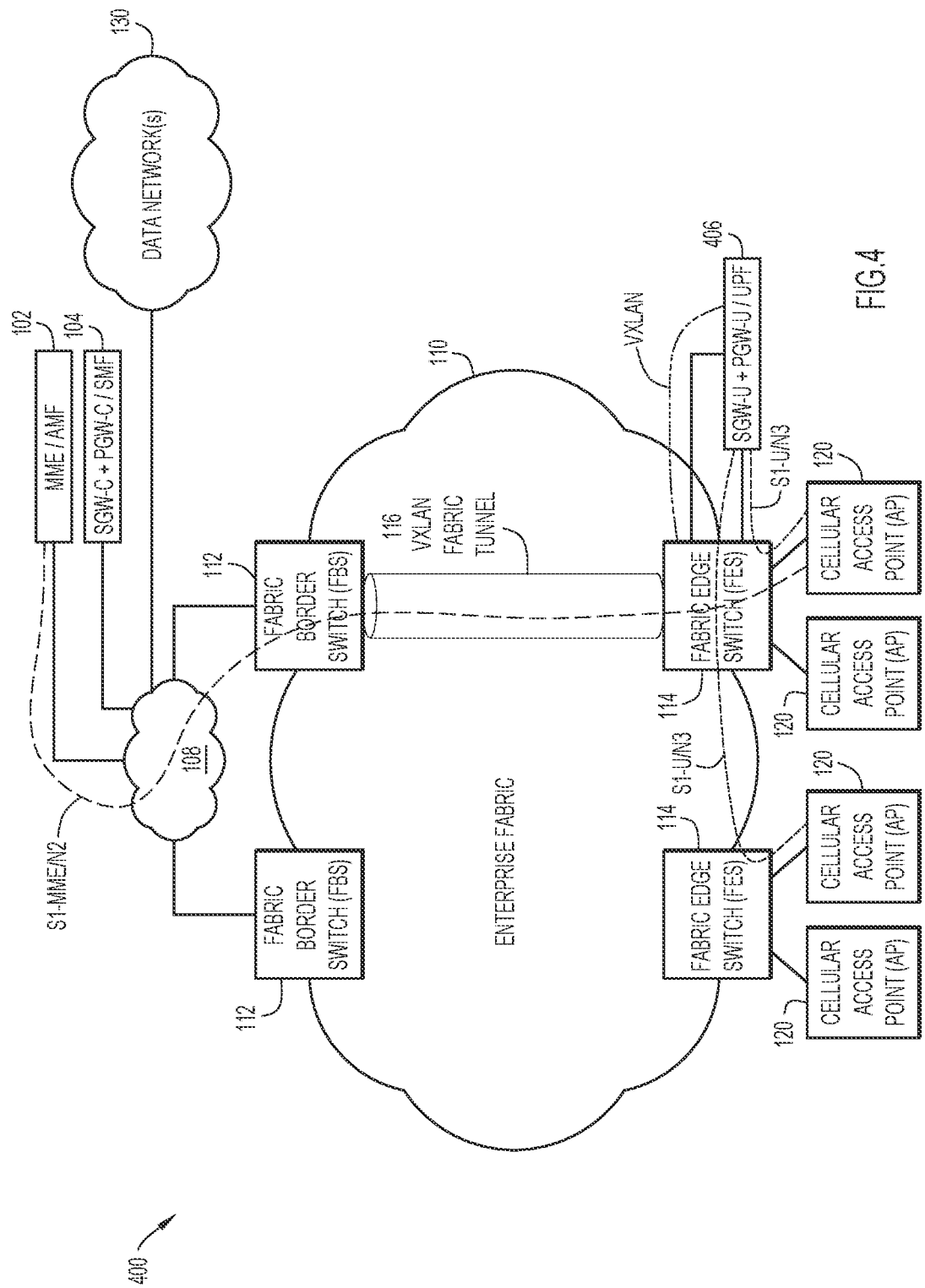
FIG. 4 is a block diagram of another example system in which techniques that provide for integrating cellular access into an enterprise fabric may be implemented, according to an example embodiment.

Referring to FIG. 4, FIG. 4 is a block diagram of another example system 400 in which techniques that provide for integrating cellular access into an enterprise fabric may be implemented, according to an example embodiment. System 400 may provide a cellular fabric edge implementation including a fabric-enabled SGW-U+PGW-U/UPF 406 that is located at the fabric edge (via fabric edge switch 114) as opposed to the fabric border in which fabric-enabled SGW-U+PGW-U/UPF 406 includes interworking into the VXLAN data plane. For the embodiment of FIG. 4, clients can be configured as 'static clients' (as noted for system 300 of FIG. 3) in which pre-determined or defined IP pool(s) can be allocated to APNs/DNNs in which the defined IP pool(s) are linked to specific fabric edge switch 114 ports (or virtual switch ports) and mapped to preconfigured enterprise group tags. Further for the embodiment of FIG. 4, S1-MME/N2 interface communications (as may be prescribed by 3GPP standards) between MME/AMF 102 and cellular AP 120 via fabric border switch 112 and fabric edge switch 114 of enterprise fabric 110; whereas S1-U/N3 interface communications (as may be prescribed by 3GPP standards) between SGW-U+PGW-U/UPF may be facilitated via fabric edge switch 114 of enterprise fabric 110.

Figure 5:
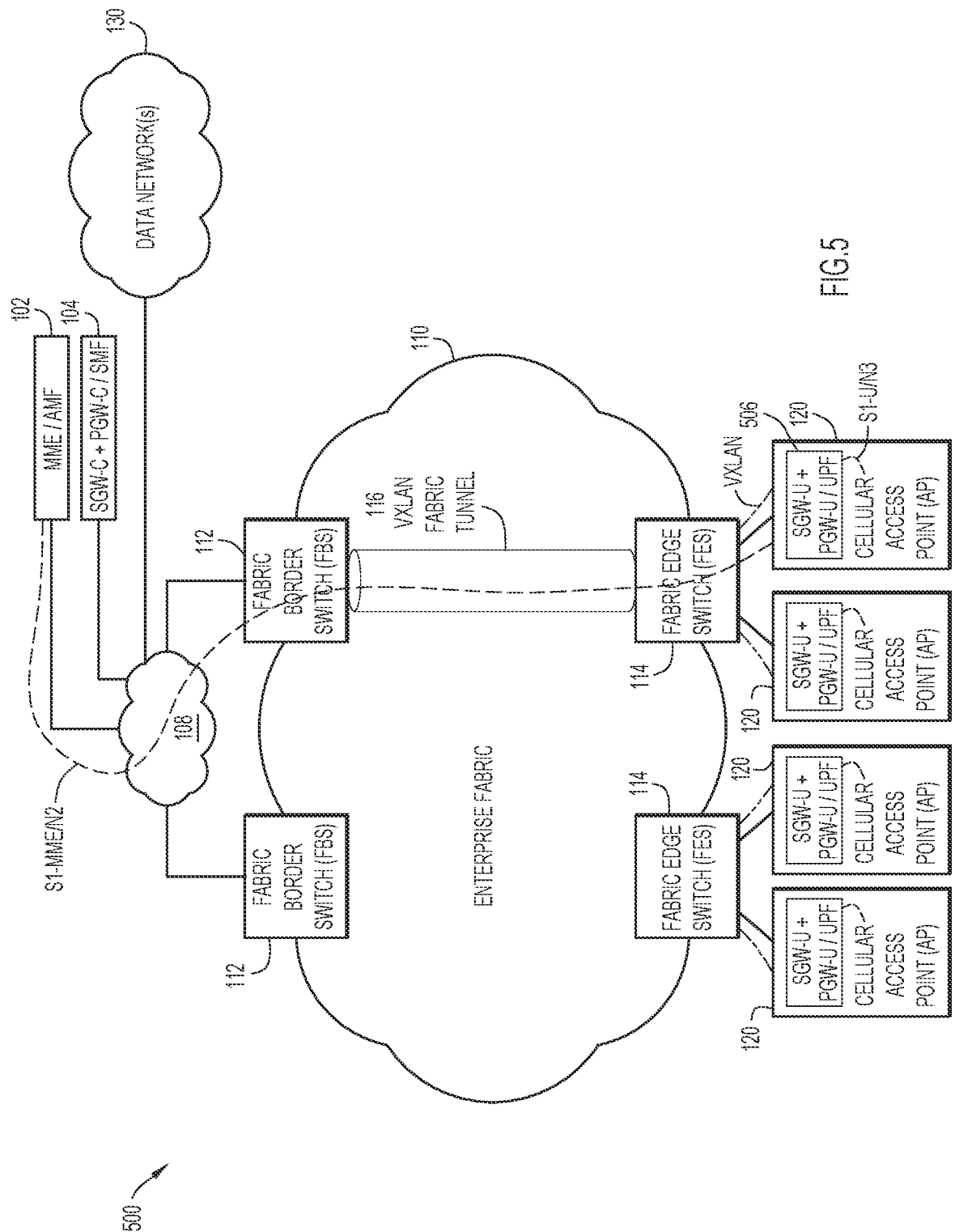
FIG. 5 is a block diagram of another example system in which techniques that provide for integrating cellular access into an enterprise fabric may be implemented, according to an example embodiment.

Referring to FIG. 5, FIG. 5 is a block diagram of another example system 500 in which techniques that provide for integrating cellular access into an enterprise fabric may be implemented, according to an example embodiment. System 500 may provide an implementation in which a SGW-U+PGW-U/UPF 506 is integrated into a cellular AP 520 (which may be inclusive of a CBRS variant cellular AP) to fully compose the cellular data plane together and interwork with the VXLAN data plane. For the embodiment of FIG. 5, clients can be configured as 'static clients' (as noted for system 300 of FIG. 3) in which pre-determined or defined IP pool(s) can be allocated to APNs/DNNs in which the defined IP pool(s) are linked to specific fabric edge switch 114 ports (or virtual switch ports) and mapped to preconfigured enterprise group tags. Further for the embodiment of FIG. 5, S1-MME/N2 interface communications (as may be prescribed by 3GPP standards) between MME/AMF 102 and cellular AP 120 via fabric border switch 112 and fabric edge switch 114 of enterprise fabric 110; whereas S1-U/N3 interface communications (as may be prescribed by 3GPP standards) between SGW-U+PGW-U/UPF may be external to the enterprise fabric in that such communications may be facilitated via the cellular AP 120.

Figure 6:
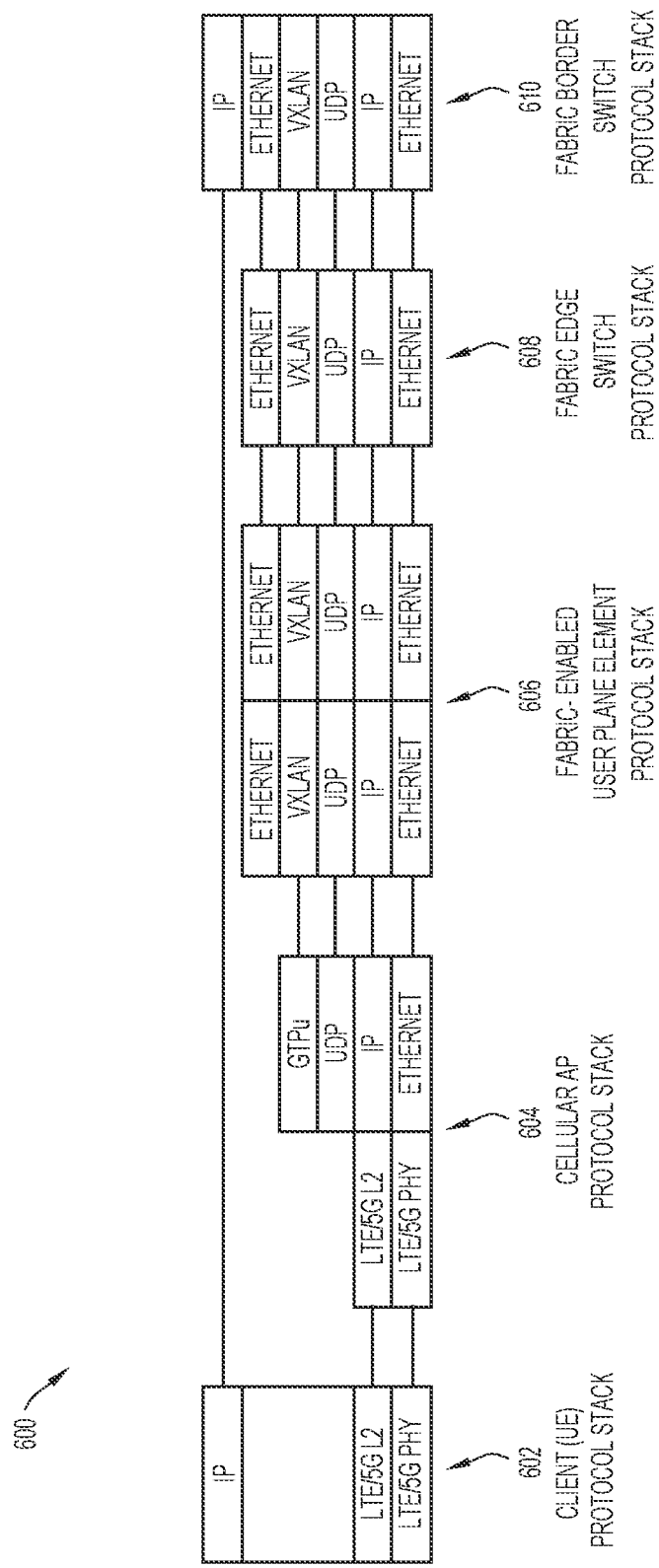
FIG. 6 is a schematic diagram illustrating example protocol stacks for elements of the systems of FIGS. 2, 4, and 5, according to an example embodiment.

Referring to FIG. 6, FIG. 6 is a schematic diagram 600 illustrating example protocol stack details for elements of the systems of FIGS. 2, 4, and 5, according to an example embodiment. FIG. 6 illustrates a client protocol stack 602, a cellular AP protocol stack 604, a fabric-enabled user plane element (e.g., SGW-U+PGW-U/UPF) protocol stack 606, a fabric edge switch protocol stack 608, and a fabric border switch protocol stack 610.

Each protocol stack can include a number of protocol layers or, more generally, layers that can facilitate the exchange of communications in an enterprise fabric, such as enterprise fabric. A 'protocol layer' or a 'layer', as referred to herein, can be any layer in a multi-layered scheme that facilitates communications between layers, such as, for example, the Open Systems Interconnection (OSI) Model, using one or more communication protocols. A set of one or more interconnected layer(s) can be referred to herein as a 'protocol stack'. In some embodiments, a protocol stack may include only one layer.

Client protocol stack 602 may include an IP layer, a Layer 2 (L2) LTE/5G layer, and a LTE/5G physical (PHY) layer. Cellular AP protocol stack 604 may include a L2 LTE/5G layer and a LTE/5G PHY layer for interfacing with corresponding layers of client protocol stack 602. Cellular AP protocol stack 604 may further include a user plane General Packet Radio Service (GPRS) Tunneling Protocol (GTPu or GTP-U) layer, a User Datagram Protocol (UDP) layer, an IP layer, and an Ethernet layer for interfacing with corresponding layers of fabric-enabled user plane element protocol stack 606.

Fabric-enabled user plane protocol stack 606 may include a GTPu protocol layer, a UDP protocol layer, an IP layer, and an Ethernet layer for interfacing with corresponding layers of cellular AP protocol stack 604. In at least one embodiment, fabric-enabled user plane element protocol stack 606 may optionally include a DHCP layer. Fabric-enabled user plane protocol stack 606 may further include a first (overlay) Ethernet layer, a VXLAN layer, a UDP layer, an IP layer, and a second (underlay) Ethernet layer for interfacing with corresponding layers of fabric edge switch protocol stack 608. Fabric edge switch protocol stack 608 may include a first (overlay) Ethernet layer, a VXLAN layer, a UDP layer, an IP layer and a second (underlay) Ethernet layer for interfacing with corresponding layers of fabric-enabled user plane element protocol stack 606 and with corresponding layers of fabric border switch 610. Fabric border switch protocol stack 610 may include an IP layer for interfacing with the corresponding IP layer of client protocol stack 602. Fabric border switch protocol stack 610 may further include a first (overlay) Ethernet layer, a VXLAN layer, a UDP layer, an IP layer, and a second (underlay) Ethernet layer for interfacing with corresponding layers of fabric edge switch protocol stack 608.

For the fabric integration illustrated in system 200 of FIG. 2, system 400 of FIG. 4, and system 500 of FIG. 5, the SGW-U+PGW-U/UPF (e.g., user plane element) interworks with the VXLAN enterprise fabric in the same manner as a fabric-enabled AP is integrated into the VXLAN enterprise fabric.

In one embodiment, an extension for cellular access in these systems is that clients (UE devices) can be configured as 'static clients' (as discussed for system 300 of FIG. 3) in which pre-determined or defined IP pool(s) can be allocated to APNs/DNNs in which the defined IP pool(s) are linked to specific fabric edge switch 114 ports (or virtual switch ports) and mapped to preconfigured enterprise group tags.

In another embodiment, an extension for cellular access in these systems is that IP address allocation for connected client UE devices can be performed using a derived MAC address (for a client) and performing a DHCP query into a DHCP service block of an enterprise fabric controller (e.g., a network/policy management and analytics platform/function such as a Cisco® Digital Network Architecture Center (DNAC)+DHCP Server+Cisco® Identity Services Engine (ISE) or any other similar network/policy management and analytics function).

Additionally for VXLAN enterprise fabric interworking and providing Layer 2/Layer 3 authorization in the enterprise fabric 110, a SGW-U+PGW-U/UPF and SGW-C+PGW-C/SMF are to use a derived MAC address to insert into the user plane stack for transport across the enterprise fabric 110. Although only one SGW-U+PGW-U/UPF is illustrated in the systems of FIGS. 1-5, it is to be understood that multiple SGW-U+PGW-U/UPFs may be implemented in such systems. In some implementations, client location may be determined via a Tracking Area Identifier (TAI), a Routing Area Identifier (RAI), a Location Area Identifier (LAI), and/or any other location-based information that may be determined via communications with a client based on the cellular access point to which the client is connected can be used to facilitate proximity-based selection for selecting a SGW-U+PGW-U/UPF to handle the client's session. In still some embodiments, a SGW-C+PGW-C/SMF can be integrated with an enterprise DHCP server/service for implementing enterprise fabric cellular access.

Figure 7:
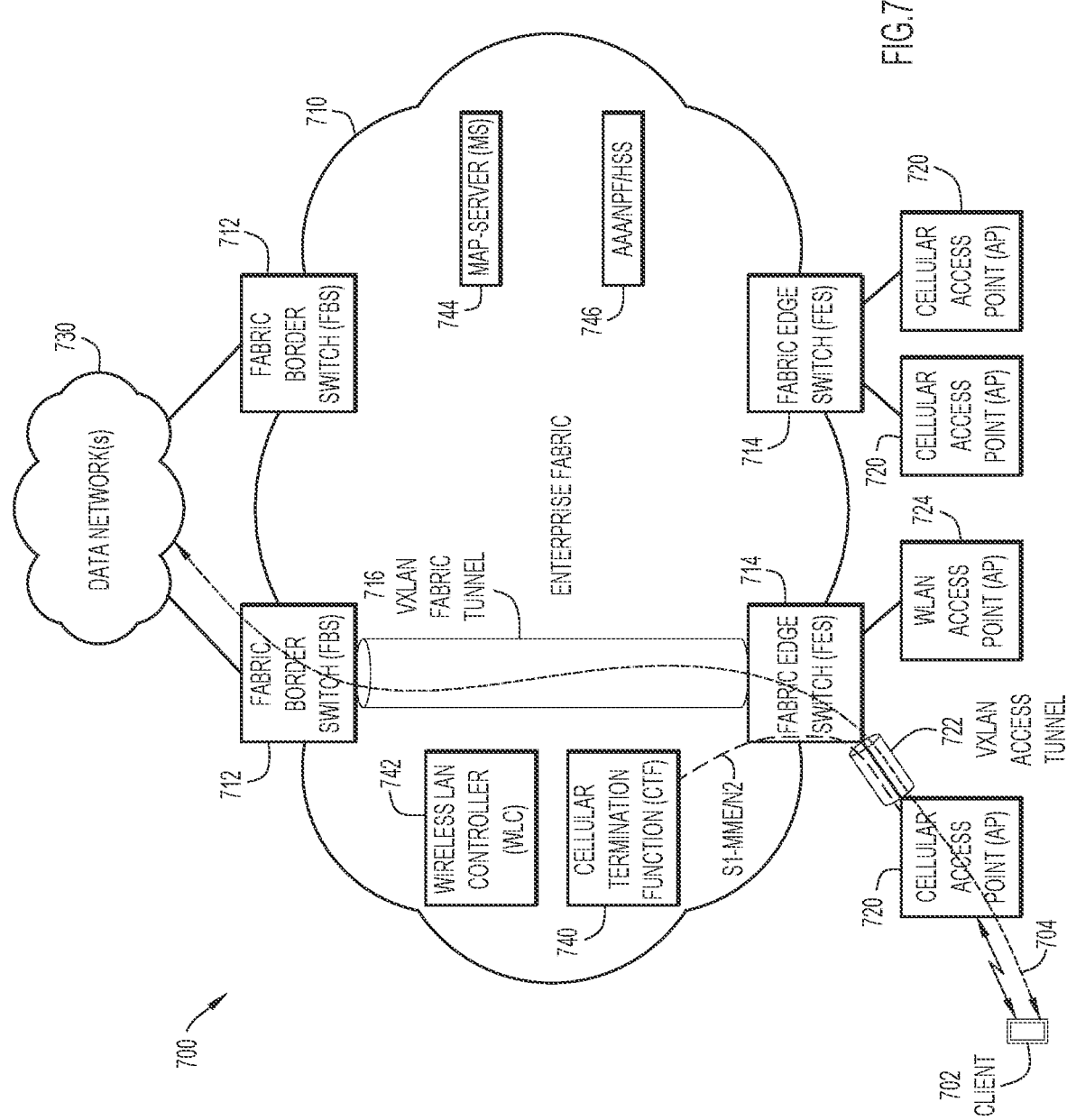
FIG. 7 is block a diagram of a system in which techniques that provide for integrating cellular access into an enterprise fabric using a Third (3rd) Generation Partnership Project (3GPP) fabric anchor may be implemented, according to an example embodiment.

Referring to FIG. 7, FIG. 7 is block a diagram of a system 700 in which techniques that provide for integrating cellular access into an enterprise fabric using a 3GPP fabric anchor, also referred to herein as a cellular termination function (CTF), may be implemented according to an example embodiment. In at least one implementation, system 700 may include an enterprise fabric 710, one or more cellular AP(s), such as a cellular AP 720 (which may be inclusive of a CBRS variant cellular AP), one or more WLAN AP(s), such as a WLAN AP 724, and one or more data network(s) 730. Also shown in FIG. 7 is a client 702. Cellular AP 720 may be implemented in any configuration (e.g., eNB, gNB, CBSD, combinations thereof, etc.) as discussed above for cellular AP 120. Data network(s) 730 may also be implemented in any configuration as discussed above for data network(s) 130.

In general, WLAN AP 724 may be configured with appropriate hardware (e.g., processor(s), memory element(s), antennas and/or antenna arrays, baseband processors (modems), and/or the like), software, logic, and/or the like to provide over-the-air coverage for a WLAN access network (e.g., Wi-Fi®, etc.). In various embodiments, WLAN AP 114 may be implemented as a Wi-Fi access point (AP) and/or the like.

Although illustrated as separate APs, in some embodiments cellular AP 720 and WLAN AP 724 may be a combined access point to provide any combination of cellular and WLAN accesses.

Enterprise fabric 710 may include one or more fabric border switch(es), such as a fabric border switch (FBS) 712, one or more fabric edge switch(es), such as a fabric edge switch (FES) 714, a cellular termination function (CTF) 740, a wireless LAN controller (WLC) 742, a Map-Server (MS) 744, and any combination of: an authentication, authorization, and accounting function (AAA), a network policy function (NPF), and/or a 3rd Generation Partnership Project (3GPP) Home Subscriber Server 746 (referred to herein as AAA/NPF/HSS 136). A fabric edge switch may also be referred to herein as an access switch. It is to be understood that elements of enterprise fabric 710 may be interconnected using any wired and/or wireless connections to facilitate communications, operations, etc. among the elements as discussed for techniques described herein.

Enterprise fabric 710, which may employ a software defined access (SDA), and may represent a programmable network that provides software-based policy and segmentation from an edge of the enterprise fabric to applications/devices/nodes/etc. external to the enterprise fabric that utilizes the enterprise fabric for end-to-end connectivity, as discussed for enterprise fabric 110. Enterprise fabric 710 (also referred to as SDA/enterprise fabric 710) is access-agnostic and may provide end-to-end connectivity for any access type and/or combination of access types (e.g., wired, cellular, Wi-Fi, etc.). FES 714 may be provided on an edge of the enterprise fabric 710 to provide connectivity to one or more access points, such as cellular AP 720 and WLAN AP 724. FES 714 may also operate as a point of policy enforcement for enterprise fabric 710. FBS 712 facilitates connectivity of the enterprise fabric 110 to external networks, such as data network(s) 730.

Enterprise fabric 710 may include an overlay network, such as a Virtual Extensible Local Area Network (VXLAN or VxLAN) overlay network, built on top of an underlay network. The VXLAN overlay network may facilitate tunneling for the user plane of enterprise fabric 710. Although embodiments herein provide example details associated with VXLAN, other tunneling protocols may be implemented for enterprise fabric 710 including, but not limited to, Generic Routing Encapsulation (GRE) (as may be prescribed at least by Internet Engineering Task Force (IETF) Request For Comments (RFC) 1701 and 2784), IP-in-IP (as may be prescribed at least by RFC 2003), IP-in-UDP, among others.

As discussed previously, a LISP implementation may utilize various constructs including RLOCs that may be associated with edge and border switches (e.g., fabric edge switch 714 and fabric border switch 712) and endpoint identifiers (EIDs) that may be associated with/identify clients attached to enterprise fabric 710 via various accesses, such as client 702 connected via an air interface with cellular AP 720, in order to facilitate mobility via enterprise fabric 710. As noted previously, edge and border switches may be considered tunnel routers (TRs) that may provide ingress and egress tunnel routing operations to facilitate network communications and may also be referred to xTRs or PxTRs. In one instance, a VXLAN overlay tunnel, such as VXLAN fabric tunnel 716 may be implemented between FES 714 and FBS 712 using LISP to provide network connectivity across enterprise fabric 710. Additionally, a VXLAN access tunnel 722 may be implemented between FES 714 and cellular AP 720 to facilitate data connectivity for client 702 with enterprise fabric 710.

Client 702 may be configured with appropriate hardware (e.g., processor(s), memory element(s), antennas and/or antenna arrays, baseband processors (modems), and/or the like), software, logic, and/or the like to facilitate an over-the-air (air) interface for accessing/connecting to cellular AP 120. Client 702 may be referred to interchangeably herein as 'user/device 702', 'UE 702', and variations thereof.

In various embodiments, client 702 may be associated with any electronic device, machine, robot, etc. wishing to initiate a flow in system 700. The terms 'user equipment', 'subscriber', 'mobile device', 'device', 'electronic device', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, a smartphone, a tablet, an IP phone, any other device and/or combination of devices, component, element, and/or object capable of initiating voice, audio, video, media, or data exchanges within system 700. Clients discussed herein may also be inclusive of a suitable interface to a human user such as a microphone, a display, a keyboard, or other terminal equipment. Clients discussed herein may also be any device that seeks to initiate a communication on behalf of another entity or element such as a program, a database, or any other component, device, element, or object capable of initiating an exchange within system 700. It is to be understood that any number of clients 702 may be present in system 700.

As referred to herein, the term 'downlink' (DL) may refer to communications (e.g., packets, signaling, etc.) directed to a client from a network and the term 'uplink' (UL) may refer to communications directed to a network from a client.

System 700 may provide an implementation in which CTF 740 is integrated into the enterprise fabric 710 architecture. There is interworking between CTF 740 and the other fabric elements, such as Map-Server 744, AAA/NPF/HSS 746, etc. There is no UPF involved in the implementation as the S1-U/N3 interface can be natively integrated into the enterprise fabric's VXLAN-based access tunnel 722. Capabilities such as cellular paging, cellular QoS, cellular mobility, etc. can be realized by extending the LISP interfaces to the xTR nodes (e.g., FES 714, FBS 712) in a manner such that enterprise fabric 710 can be implemented with no 3GPP UPF/SGW-U/PGW-U elements deployed within the fabric while still providing for the ability to facilitate end-to-end (e.g., client-to-data network, data network-to-client, client-to-client, etc.) connectivity for supporting cellular services for client data flows within the fabric.

Thus, for techniques provided herein, CTF 740 may provide/be responsible for any combination of cellular-based access authentication services, authorization services, mobility management control, session management services with various functions being supported on a per-session basis, and/or the like. CTF 740 may terminate the S1-MME interface from cellular AP 122 for 4G/LTE and/or the N1/N2 interfaces for 5G. In various embodiments, CTF 740 may be configured with functionality that may inherit functionality in whole or in part as may typically be associated with any combination of a 4G/LTE Mobility Management Entity (MME), a Serving Gateway (SGW), and/or a Packet Data Network (PDN) Gateway (PGW); a 5G Access and Mobility Management Function (AMF) and/or Session Management Function (SMF), and/or the like now known here or hereafter developed.

Accordingly, techniques herein provide for defining and implementing an approach in which 3GPP core functions such as the MME+PGW-C+SGW-C (for 4G/LTE architectures) and/or the AMF+SMF (for 5G architectures) can be collapsed and shrunk into a control plane entity or function, such as the CTF 740. By leveraging the services that are provided by functions of enterprise fabric 710 (e.g., MS, AAA, NPF, etc.), CTF 740 can provide most of the functions that a typical EPC offers to a client (e.g., authentication, IP address management, IP mobility, QoS, etc) to successfully enable private cellular access in the enterprise fabric 710 architecture.

WLC 742 may provide/be responsible for wireless LAN functions such as, WLAN-based access authentication services, authorization services, intrusion prevention, RF management, and/or the like to facilitate client connectivity via WLAN AP 724. In some implementations, WLC 742 may be configured as an evolved WLC (eWLC). Although illustrated as separate entities for the embodiment of FIG. 7, in at least one embodiment, CTF 740 and WLC 742 may be configured as a combined or converged multi-access termination function (MATF) that may be configured to provide operations, functions, etc. as discussed for embodiments herein for multiple accesses with which enterprise fabric 710 may interface.

AAA/NPF/HSS 746 may provide/be responsible for any combination of: providing authentication, authorization, and accounting functions for clients (e.g., client 102) that may be present in system 700; managing subscription/policy information for one or more clients that may be present in system 700 (e.g., converged access profile information, as discussed below, among other subscription/policy information); maintaining per-client session information for various accesses to which each client is connected; combinations thereof; and/or the like. In various embodiments, AAA/NPF/HSS 746 may be implemented as any combination of standalone and/or combined elements (e.g., separate AAA, NPF, and HSS elements; a combined AAA/HSS element without an NPF element; an AAA element and an NPF element without an HSS element; etc.) in order to facilitate authentication, authorization, and accounting operations (referred to herein as 'AAA-based' operations) as well as policy-based operations for enterprise fabric 710.

Generally, authentication refers to the process where an entity's identity is authenticated, typically by providing evidence that it holds a specific digital identity such as an identifier/identity and corresponding credentials/authentication attributes/etc. Generally, authorization can be used to determine whether a particular entity is authorized to perform a given activity, typically inherited from authentication when logging on to an application or service. In various instances, authorization may be determined based on a range of restrictions, for example time-of-day restrictions, or physical location restrictions, or restrictions against multiple accesses by the same entity or user/device. Generally, accounting refers to the tracking of network resource consumption by users/devices for the purpose of capacity and trend analysis, cost allocation, billing, etc.

In various embodiments, AAA/NPF/HSS 746 may be configured with or obtain (e.g., from an external database/service/etc.) per-client converged access profile information that may include, but not be limited to, client (e.g., user/device) identity information, authentication type attributes (e.g., authentication type, sub-type, etc.), authentication attributes (e.g., credentials, passwords, keys, etc.), combinations thereof, and/or the like. Additionally, AAA/NPF/HSS 746 may be configured with or obtain (e.g., from an external database/service/etc.) per-client subscription/policy information that may include, but not be limited to, service quality information such as Quality of Service (QoS) information, QoS Class Identifier (QCI), Guaranteed Bit Rate (GBR), Maximum Bit Rate (MBR), Aggregate Maximum Bit Rate (AMBR), Allocation and Retention Priority (ARP), packet delay information, packet loss information, combinations thereof, and/or the like for one or more client sessions. In various embodiments, subscription/policy information may also include 3GPP service name information such as APN for 4G/LTE networks and/or DNN for 5G networks, combinations thereof, and/or the like for one or more client sessions.

In various embodiments, AAA/NPF/HSS 746 may be configured with one or more databases/repositories/etc. and/or may interface with one or more external databases/repositories/etc. in order to obtain and/or be configured with access profile information, subscription/policy information, etc. for clients. Such internal/external databases/repositories/etc. may include any combination of enterprise databases, repositories, and/or the like for one or more clients that may be allowed to connect to accesses with which enterprise fabric 710 may interface. In various embodiments, AAA/NPF/HSS 746 may be implemented as any combination of a Cisco® Digital Network Architecture Center (DNAC or DNA-C) Access Control Application (ACA), a Cisco® Identity Services Engine (ISE), an AAA, an enterprise policy server/manager, a 3GPP HSS, combinations thereof, and/or the like.

AAA/NPF/HSS 746 may be capable of interfacing/communicating with other elements of system 700 (e.g., CTF 740 and WLC 742) via any combination of Remote Authentication Dial-In User Service (RADIUS) protocol mechanisms (e.g., messaging, signaling, etc.), DIAMETER protocol 3GPP S6a interface mechanisms, S6a-based interface mechanisms (e.g., for architectures that may involve interfaces based on, but not strictly adhering, to 3GPP defined S6a interface mechanisms), Application Programming Interface (API) mechanisms (e.g., for messaging, signaling, etc. that may be defined by an enterprise, 3rd-party, application, etc.), fabric-defined interfaces (e.g., as may be defined by an enterprise), combinations thereof, and/or the like.

In various implementations, a converged access profile for a particular client can be configured as a combined profile for multiple accesses or can be configured within separate profiles in which each profile for the particular client can be correlated to the particular client based on client access specific identities/identifiers configured for each access. Thus, a converged access profile for a client, such as client 702, may include a per-access type profile for each access type to which the client is allowed to connect. Identification information for a client (e.g., access identities/identifiers) for each of multiple access types to which the device is allowed to connect (e.g., WLAN/wired, cellular, etc.) is provided in the converged access profile.

Different access specific identifiers/identities for a client can be envisioned. For example, International Mobile Subscriber Identity (IMSI) may be used for cellular accesses, Network Access Identifier (NAI) may be used for enterprise WLAN/wired accesses, etc. Other client identifiers can be envisioned including, but not limited to, International Mobile Equipment Identity (IMEI), IMEI software version (IMEISV), Permanent Equipment Identifier (PEI), Subscription Concealed Identifier (SUCI), Universally Unique Identifier (UUID), station (STA) serial number, factory configured MAC address, any other stable or permanent identifier for the client, combinations thereof, and/or the like now known or hereafter developed. As referred to herein, a stable identifier for a client may refer to a client identifier that consistently identifies the client for a particular system (e.g., enterprise fabric 110) and a permanent identifier for a client may refer to a client identifier that consistently identifies the client across multiple systems (e.g., fabrics for multiple enterprises, mobile service providers, etc.).

In some implementations, a converged access profile configured for a particular client via AAA/NPF/HSS 746 may be configured as a combined profile including multiple per-access type entries for each access type to which the particular client can connect. In other implementations, a converged access profile configured for a particular client via AAA/NPF/HSS 746 may be configured using separate per-access profiles in which each per-access profile/entry for the particular client can be correlated together by AAA/NPF/HSS 746 based on the client access specific identities/identifiers configured for each access type. For example, AAA/NPF/HSS 746 can correlate or link multiple entries/access type profiles for a converged access profile of a client such that an enterprise-based WLAN/wired access identifier/identity (e.g., NAI) for the client can be mapped to a cellular (e.g., private 5G/LTE) access identity/identifier (e.g., IMSI, etc.) for the client, or vice-versa. Such linking functionality may be utilized by AAA/NPF/HSS 746 when creating/maintaining/updating session information for a client for multiple accesses and/or for performing other operations/functions as described herein.

Map-Server (MS) 744 is a LISP function that represents a distributed mapping database and service that accepts registration information for clients (e.g., client 702) and/or other endpoint users/devices, etc., and stores mappings between numbering or name space (referred to herein, generally, as 'space') constructs used by the VXLAN overlay of enterprise fabric 710. The mappings define VXLAN tunnels for traffic flows across and in-and-out of enterprise fabric 710 such as VXLAN fabric tunnel 716 and VXLAN access tunnel 722. For the LISP implementation of enterprise fabric 710, Map-Server 744 stores mappings, generally known as EID-to-RLOC mappings, between RLOCs for fabric switches/functions/etc. (e.g., FES 714) and EIDs for clients (e.g., client 702) for which traffic is handled or otherwise associated with the switches/functions/etc. EIDs can be associated with any combination of IP and/or MAC addresses for a client for different EID-to-RLOC mappings that may be maintained/managed within SDA/enterprise fabric 110. EID-to-RLOC mapping information can be communicated to various elements of enterprise fabric 110 (e.g., FES 114, FBS 112, CTF 740, etc.) and stored in the map-cache of the elements to facilitate routing via enterprise fabric 110. During operation for techniques provided herein, a virtual MAC (vMAC or VMAC) address can be derived or generated for a client. A virtual MAC address is not an actual predetermined (e.g., factory set, etc.) MAC address of a client, but rather an artificial MAC address that may be created to satisfy operational features for forwarding traffic for the client via a L2 overlay provided for enterprise fabric 710.

Although details discussed for various examples herein may be associated with generating a vMAC for client 702, in some embodiments, a L3 overlay may be provided for enterprise fabric 710 in which no vMAC is generated for client 702. For a L3 overlay, a dummy MAC may be defined that can be used to indicate to the edge switch that the access tunnel lookup is to be performed based on IP address of the client 702 and not a MAC address of the client. Thus, a dummy MAC may be characterized a predefined MAC address that is not associated with a client, but rather an indicator can be used in a L3 overlay implementation for enterprise fabric 710.

While Map-Server 744 provides a central control point for facilitating mobility across enterprise fabric 710, CTF 740 represents an access control point that integrates operationally with the Map-Server. To this end, in one embodiment, CTF 740 may communicate with AAA/NPF/HSS 746, WLC 742, Map-Server 744, and cellular AP 720 using any combination of protocols such as RADIUS, DIAMETER, fabric-based protocols, API-based protocols, etc. CTF 740 can also communicate with client 702 via cellular AP 720; for example, logically, Non-Access Stratum (NAS) messages can be exchanged between client 702 and CTF 740, but these messages are transported over the Access Stratum (AS) via the air interface between the client and the cellular AP.

During operation, techniques provided herein may provide for integrating cellular access into enterprise fabric 710 by registering at least one cellular AP, such as cellular AP 720, within enterprise fabric 710 and establishing data plane connectivity with enterprise fabric 710 for a client, such as client 702, which seeks to connect to the cellular access. Data plane connectivity within enterprise fabric 710 may also be provided between FBS 712 and FES 714 via VXLAN fabric tunnel 716.

In at least one embodiment, registering the cellular AP 720 within the enterprise fabric 710 may include various operations such as, but not be limited to: registering an IP address of the cellular AP 720 in a Layer 3 (L3)-EID space (also referred to as the L3 VXLAN Network Identifier (L3-VNID) space) for Map-Server 744; registering a MAC address of the cellular AP in a L2-EID space (also referred to as the L2-VNID space) for Map-Server 744; and creating a VXLAN access tunnel (e.g., VXLAN access tunnel 722) to the cellular AP 720 by the FES 714 to which the cellular AP 720 is connected. In LISP terminology, a VNID is referred to as a LISP Instance-ID (IID). Typically, a LISP IID is rendered into a VXLAN VNID in data plane elements (e.g., xTRs) for encapsulation. Thus, for various examples/discussions provided herein, it is to be understood that a VNID may also refer to a LISP Instance-ID (IID). In at least one embodiment, creating the VXLAN access tunnel 722 may include setting up encapsulation and decapsulation information for the tunnel. Other details associated with registering cellular AP 720 within enterprise fabric 710 and Map-Server 744 are discussed below at least with reference to FIGS. 9A-9B.

Using techniques herein, end-to-end data plane connectivity (illustrated as dashed-line 704) can be established between client 702 and one or more data network(s) 730 via enterprise fabric 710. For establishing data plane connectivity via enterprise fabric 710 for client 702, techniques provided herein may include, in at least one embodiment, various operations such as, but not limited to: authenticating the client 702 for the cellular access; obtaining (e.g., deriving or generating) a L2 EID, such as a vMAC address, for client 702; registering the vMAC address for client 702 in the L2-VNID/EID space for Map-Server 744; allocating an IP address for client 702 in which the IP address represents a L3 EID for the device; registering the IP address for client 702 in the L3-VNID/EID space for Map-Server 744; provisioning L2 and L3 EIDs for client 702 by FES 714 and FBS 712 (e.g., via IP-to-MAC learning, receiving push-type notifications, etc.); creating the VXLAN access tunnel 722 by FES 714; and maintaining, by the cellular AP 720 mappings between TEIDs for the client 702 (e.g., based on bearers established for the client) and the vMAC address for client 702 and/or, in some embodiments the IP address for client 702. Other details associated with establishing data plane connectivity for client 702 with enterprise fabric 710 are discussed below at least with reference to FIGS. 10A-10D.

Figure 8:
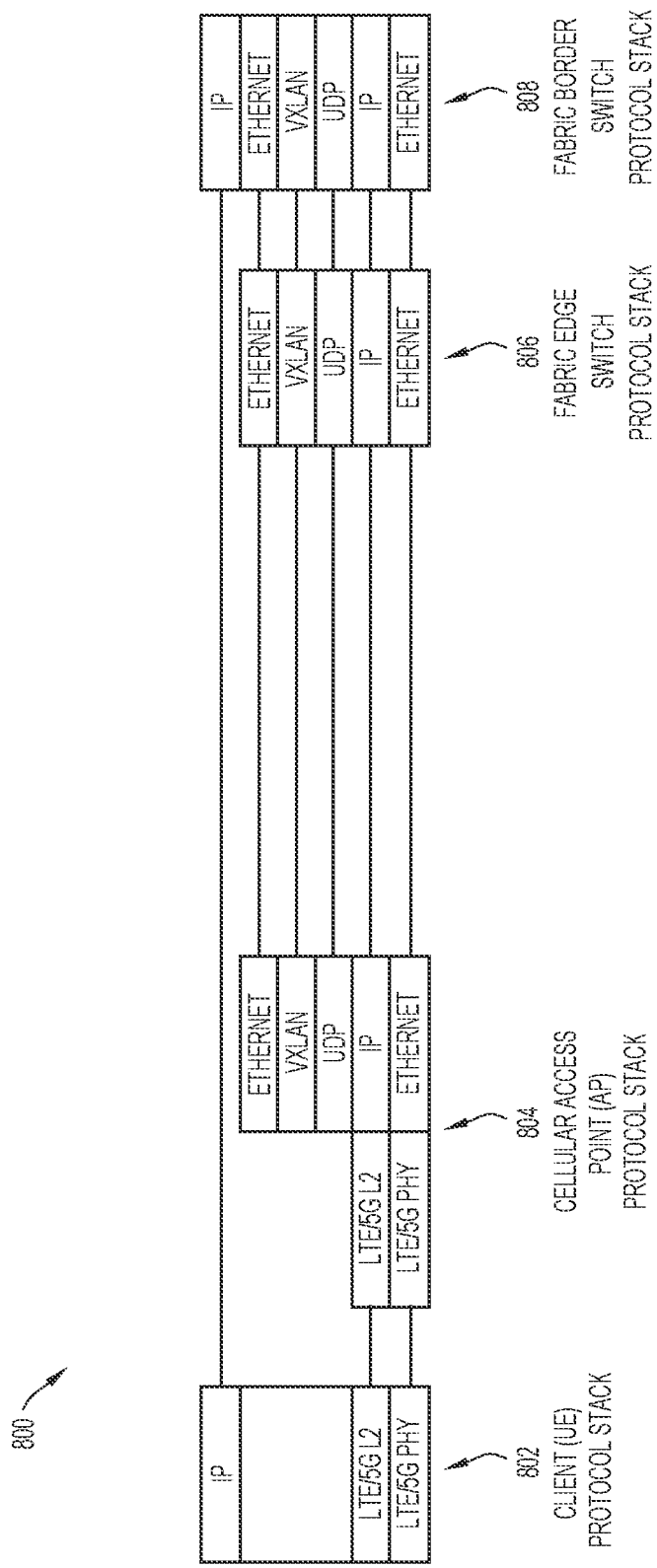
FIG. 8 is a schematic diagram illustrating example protocol stacks for elements of the system of FIG. 7, according to an example embodiment.

Referring to FIG. 8, FIG. 8 is a schematic diagram 800 illustrating example protocol stack details for elements of system 700 of FIG. 7, according to an example embodiment. FIG. 8 illustrates a client protocol stack 802 (associated with client 702), a cellular AP protocol stack 804 (associated with cellular AP 720), a fabric edge switch protocol stack 806 (associated with FES 714), and a fabric border switch protocol stack 808 (associated with FBS 712). The example protocol stacks illustrated in FIG. 8 may be characterized from an IP forwarding perspective. It is to be understood that switches may support other protocol and management stacks, for example, LISP-related protocol stacks, etc. for communicating with Map-Server 744, etc.

Client protocol stack 802 may include an IP layer, a L2 LTE/5G layer, and a LTE/5G physical (PHY) layer. Cellular AP protocol stack 804 may include a L2 LTE/5G layer and a LTE/5G PHY layer for interfacing with corresponding layers of client protocol stack 802. Cellular AP protocol stack 804 may further include a first (overlay) Ethernet layer, a VXLAN layer, a UDP layer, an IP layer, and a second (underlay) Ethernet layer for interfacing with corresponding layers of fabric edge switch protocol stack 806.

Fabric edge switch protocol stack 806 may further include a first (overlay) Ethernet layer, a VXLAN layer, a UDP layer, an IP layer, and a second (underlay) Ethernet layer for interfacing with corresponding layers of cellular AP protocol stack 804 and fabric border switch protocol stack 808. Fabric border switch protocol stack 808 may include an IP layer for interfacing with the corresponding IP layer of client protocol stack 802. Fabric border switch protocol stack 808 may further include a first (overlay) Ethernet layer, a VXLAN layer, a UDP layer, an IP layer, and a second (underlay) Ethernet layer for interfacing with corresponding layers of fabric edge switch protocol stack 808.

Figure 9A:
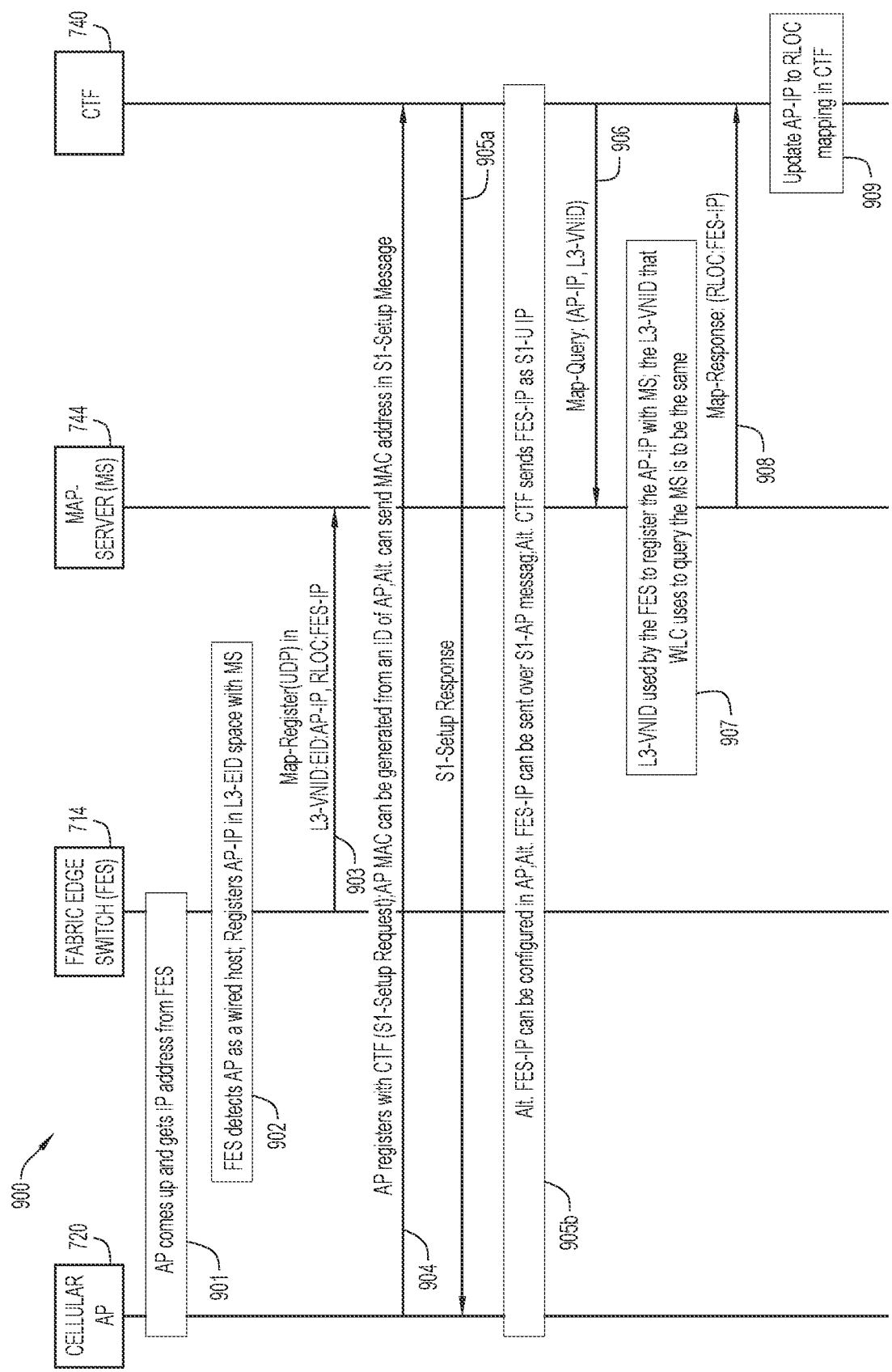

Referring to FIGS. 9A and 9B, FIGS. 9A and 9B are a message sequence diagram 900 illustrating a flow for registering a cellular AP within the enterprise fabric 710 for system 700 of FIG. 7, according to an example embodiment. FIGS. 9A-9B include cellular AP 720, FES 714, Map-Server 744, and CTF 740.

At 901, consider that cellular AP 720 initializes (e.g., is powered-on, comes up, etc.) and obtains an IP address from FES 714. At 902, FES 714 detects cellular AP 720 as a wired host and registers the cellular AP 720 IP address (referred to herein as 'AP-IP') in the L3-EID (L3-VNID) space with Map-Server 744, as shown at 903 (e.g., through Switch Integrated Security Features). The registration at 903 includes communicating a User Datagram Protocol (UDP)-based Map-Register message from FES 714 to Map-Server 744 to register in the L3-VNID space with Map-Server 744 the cellular AP 720 IP address (EID:AP-IP) and the RLOC corresponding to the IP address of FES 714 (RLOC:FES-IP). Thus, the cellular AP 720 IP address (AP-IP), is registered within the enterprise fabric 710 via the Map-Server 744.

At 904, the cellular AP 720 registers with the CTF 740 via a 3GPP standards-based S1-Setup Request. In at least one embodiment, a MAC address for the cellular AP 720 can be generated by CTF 740 from an identifier of cellular AP 720 (referred to herein as 'AP-ID'), which can be received from the cellular AP in a S1-Application protocol (S1-AP) message. In another embodiment, cellular AP 720 can send a MAC address to CTF 740 in the S1-Setup message, which may involve a protocol change to the standards-based S1-Setup message.

At 905a, CTF 740 responds to cellular AP 720 with an S1-Setup Response message. For techniques of the present disclosure, the cellular AP 720 is to know or otherwise obtain the IP address of the access switch (FES 114) so that the cellular AP 720 for the VXLAN tunnel 722 to the FES 714.

As illustrated at 905b, there may be at least three techniques for the cellular AP 720 to obtain the IP address of the FES 714 including: a) statically configuring the AP address for FES 714 (FES-IP) on the cellular AP; b) sending the IP address for FES 714 over the S1-MME/N2 interface as part of the S1-Setup Response, which is part of the S1-AP communication protocol, and may involve a protocol change or a vendor specific extension to implement; and c) S1-U tunnel endpoint being delivered during the client 702 registration with enterprise fabric 110. Using any of these techniques, the cellular AP can set the tunnel endpoint towards FES 714. The FES 714 has the IP address of the cellular AP 720 (as discussed above at 901), so setting up the VXLAN access tunnel from FES 714 to cellular AP 720 can be achieved by FES 714.

At 906, CTF 740 communicates a Map-Query (AP-IP, L3-VNID) message to Map-Server 744 to determine the RLOC for FES 714. As illustrated at 907, the L3-VNID is used by the FES 714 to register the AP-IP with Map-Server 744. The L3-VNID that WLC 742 uses to query the Map-Server 744 is to be the same as that used by FES 714. At 908, Map-Server 744 responds with a Map-Response (RLOC: FES-IP) identifying the IP address for FES 714. CTF 740 maintains a map-cache of EID-to-RLOC mappings and, at 909, updates its map-cache with the AP-IP EID to FES RLOC mapping.

As shown in FIG. 9B at 910, CTF 740 registers the AP-MAC in the L2-VNID space with Map-Server 744 using a Dummy-Client Proxy-Reg: L2-VNID(EID: AP-MAC; RLOC:FES-IP; sub-typ:AP-IP) message including and a flag 'IS_AP_FLAG=TRUE' indicating to the Map-Server 744 that the registration is associated with a cellular AP. Thus, the CTF 740 informs Map-Server 744 that AP-MAC is in the L2-VNID space and it is connected to RLOC:FES-IP. At 911, the Map-Server 744 responds with a Proxy-Reg: Acknowledgement (ACK) message.

The flag indicating that the registration is associated with a cellular AP triggers Map-Server 744 to communicate, at 912, a Proxy-Notify message in the L2-VNID space to FES 714 that includes the (EID: AP-MAC; RLOC:FES-IP; sub-typ:AP-IP) information. At 913, FES 714 creates the VXLAN access tunnel 722 to the cellular AP 720, which includes setting LISP encapsulation/decapsulation information for the VXLAN access tunnel.

In at least one embodiment, the cellular AP 720 can create/set the tunnel endpoint for the VXLAN access tunnel 722 to FES 714 upon establishment of a first client session to be handled by the cellular AP. In another embodiment, the cellular AP can set the endpoint for the VXLAN access tunnel 722 to FES 714 prior to the establishment of a first client session, if the IP address of FES 714 is known by the cellular AP 720 (e.g., based on the technique implemented for the cellular AP 720 to obtain the IP address of FES 714, as discussed at 905b).

In summary, FIGS. 9A-9B illustrate features associated with integrating/registering a cellular AP (e.g., cellular AP 720) within an enterprise fabric (e.g., enterprise fabric 710) in which the cellular AP MAC address (AP-MAC) the cellular AP IP address (AP-IP) are registered with a Map-Server (e.g., Map-Server 744) within the enterprise fabric. Further, the cellular AP is registered with a CTF (e.g., CTF 740) within the enterprise fabric, which provides S1-MME/N2 interface communications/connectivity between the cellular AP and the CTF to facilitate various cellular access operations. Thus, techniques herein provide for establishing Layer 2 and Layer 3 reachability for the cellular AP via the enterprise fabric (e.g., via the fabric edge switch 714) as well as establishing S1-MME/N2 interface connectivity via the enterprise fabric (e.g., with a cellular system control/management function, such as CTF 740, integrated into the enterprise fabric). Although example details for FIGS. 9A-9B are discussed with reference to a LISP implementation, it is to be understood that these example details can be extended to any implementation technique (e.g., Proxy Mobile IPv6, ILA, etc.) that may be used to integrate/register a cellular AP into an enterprise fabric architecture.

Referring to FIGS. 10A, 10B, 10C, and 10D, FIGS. 10A, 10B, 10C, and 10D are a message sequence diagram 1000 illustrating a call flow for providing cellular access to a client within the enterprise fabric for the system of FIG. 7, according to an example embodiment. FIGS. 10A-10D include client 702, cellular AP 720, FES 714, Map-Server 744, CTF 740, AAA/NPF/HSS 746, and FBS 712.

At 1001, consider for example, as shown in FIGS. 9A and 9B, that cellular AP 720 is connected to FES 714, that cellular AP 720 is registered with CTF 740, EIDs for the cellular AP are registered with Map-Server 744 in the enterprise fabric 710 in association with FES 714 (e.g., EID-to-RLOC mappings, and that the VXLAN access tunnel 722 from FES 714 to the cellular AP 720 is created by FES 714.

At 1002, a Radio Resource Control (RRC) connection is setup between client 702 and cellular AP 720 (e.g., as may be prescribed at least by 3GPP Technical Specification (TS) 36.300). At 1003, client 702 communicates a NAS Attach message to cellular AP 720 including a unique identifier for the client 702 over the S1 interface within the cellular AP 720 (AP-UE-S1AP ID), which triggers cellular AP 720 to generate an S1AP initial client message at 1004, such as an Attach Request message communicated to CTF 740 at 1005 that includes the AP-UE-S1AP ID for client 702, the IMSI associated with client 702, and a Tracking Area Identifier (TAI).

At 1006, CTF 740 communicates a DIAMETER-based Authentication-Information-Request (Auth Info Request or 'AIR') message to AAA/NPF/HSS 748 including the IMSI, a Public Land Mobile Network Identity (PLMNID), and the TAI. At 1007, AAA 748 validates the TAI+PLMNID for the client 702 and generates and authentication vector using authentication techniques such as Evolved Packet System Authentication and Key Agreement (EPS-AKA) functionality that may be facilitated via EPS-AKA logic configured for AAA 748. The authentication vector may be represented as {AUTN, RAND, XRES, and KASME}, in which 'AUTN' is an authentication token, 'RAND' is a random challenge, 'XRES' is an expected response to the challenge, and 'KASME' (Access Security Management Entity Key) is a root key. In at least one embodiment, the EPS-AKA logic configured for AAA 748 can perform operations for generating the authentication vector according to techniques as prescribed at least by Internet Engineering Task Force (IETF) Request For Comments (RFC) 5448 and RFC 4187.

Although techniques presented herein are discussed with reference to EPS-AKA mechanisms for cellular authentication, this is not meant to limit the broad scope of the present disclosure. In various implementations, other authentication mechanisms/protocols may be utilized (e.g., Extensible Authentication Protocol-Transport Layer Security (EAP-TLS), EAP-Tunneled TLS (EAP-TTLS), etc.) as may be understood in the art, now known here and/or hereinafter developed, which may or may not result in the generation of different authentication vectors/authentication information that may be utilized for authenticating users/devices to various access types.

Upon generation of the authentication vector, AAA/NPF/HSS 146 sends an Authentication-Information-Answer (Auth Info Answer or 'AIA') message to CTF 740 at 1008 including the authentication vector. At 1009, authentication of the client 702 for the cellular access is performed between CTF 740 and client 702 using the authentication vector. For example, the authentication vector can be used to perform an authentication between the client 702 and the CTF 740 to generate a shared key that can further be used to generate security keys, such as a cipher key (CK) and an integrity key (IK), that can be used to secure AS (Access Stratum) communications between the client 702 and the cellular AP and also to secure NAS (Non-Access Stratum) communications between the client and the CTF 740.

At 1010 and 1011, the CTF obtains cellular policy information for the client 702. For example, at 1010, CTF 740 communicates a DIAMETER-based Update-Location-Request (ULR) message to AAA/NPF/HSS 746 that includes the IMSI and PLMNID, which AAA/NPF/HSS 746 utilizes to authorize client 702 to access/join the enterprise fabric 710. At 1011, AAA/NPF/HSS 746 communicates a DIAMETER-based Update-Location-Answer (ULA) to CTF 740 that includes the IMSI, a Mobile Subscriber Integrated Services Digital Network (MSISDN) indicator, APN (e.g., APN=enterprise.com), and QCI.

Although DIAMETER-based AIR/AIA ULR/ULA exchanges between CTF 740 and AAA/NPF/HSS 746 are discussed herein, in some embodiments, a RADIUS-based Access Request/Access Accept exchange may be utilized between CTF 740 and AAA/NPF/HSS 746 to facilitate authentication/authorization of a client seeking cellular access to the enterprise fabric 710 in which such information may be carried between the CTF 740 and the AAA/NPF/HSS 746 via the Access Request/Access Accept messages.

Figure 10A:
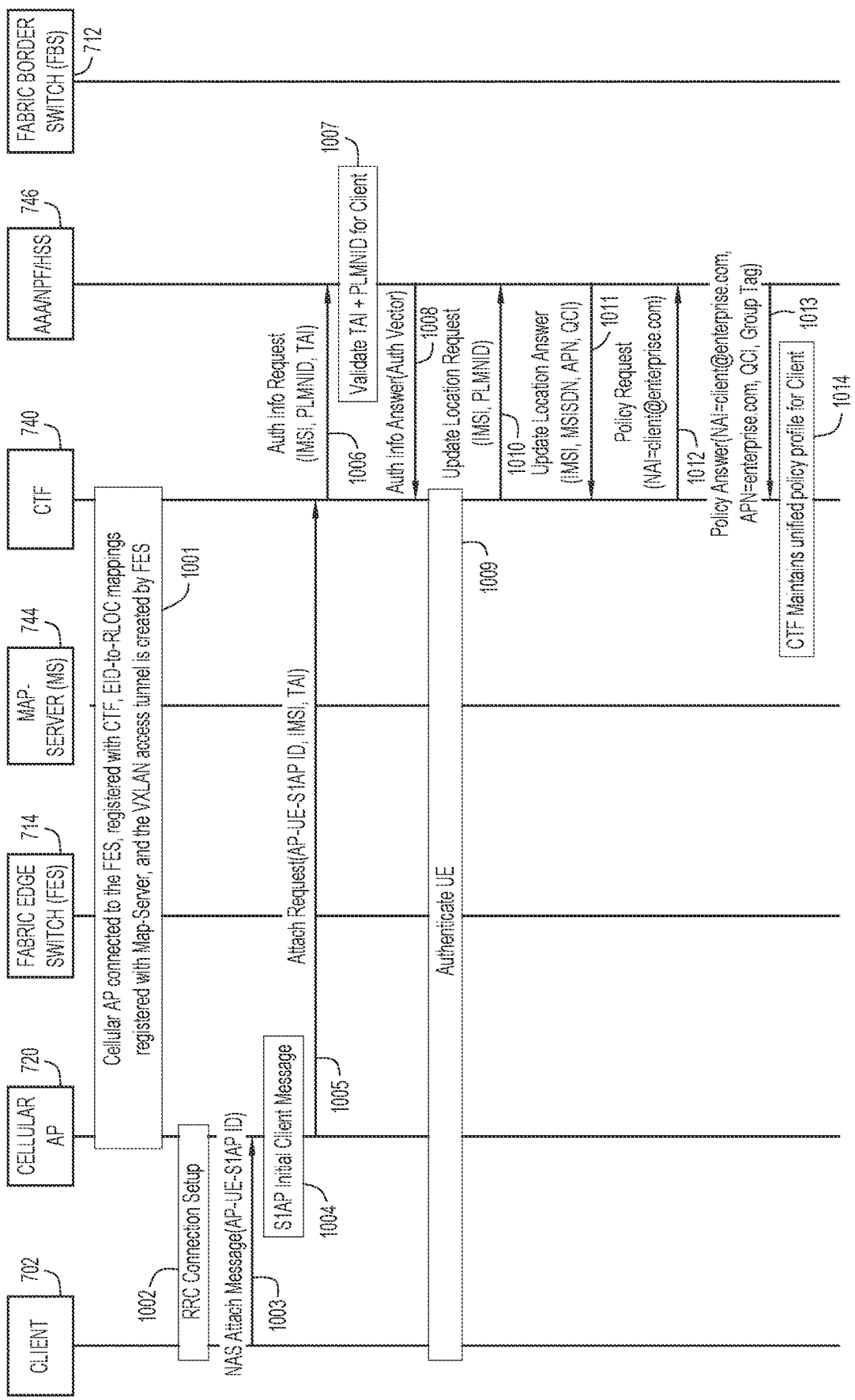

In some embodiments, CTF 740 may be configured with cellular and/or enterprise policy information for clients, such as enterprise group tag or indicator and enterprise group access control list information. However, in other embodiments, as illustrated in FIG. 10A, CTF 740 may query AAA/NPF/HSS 746 for policy information for the client 702. For example, as shown at 1012, CTF 740 can communicate a policy request to AAA/NPF/HSS 746 that includes an enterprise-based identifier for the client, such as a NAI. Consider for the present example, that the NAI for client 702 as provided in the converged access profile configured for AAA/NPF/HSS 746 is set to 'NAI=client@enterprise.com'. Thus, the policy request message communicated to AAA/NPF/HSS 746 from CTF 740 can include 'NAI=client@enterprise.com'.

At 1013, AAA/NPF/HSS 746 communicates a policy answer message to CTF 740 that includes the NAI, the APN, the QCI, and the enterprise group tag included in the policy information (e.g., converged access profile) configured for client 702 within AAA/NPF/HSS 746. It is to be understood that other policy information for the client can be included in the policy answer. Based on the response, CTF 740 at 1014 maintains a unified policy profile for the client 702 that can include cellular-based policy information for the client, such as QCI, as well as enterprise-based policy information for the client, such as the enterprise group tag/group access control list. In some implementations, various default parameters, such as QCI, may be configured in an AAA, which may be overridden by any matching parameters (e.g., QCI) that may also be configured in an NPF. Although examples herein are discussed with reference to IMSI and NAI client identifiers, it is to be understood that exchanges with any combination of AAA/NPF/HSS 746 can be performed using any client identifiers that may be obtained from exchanges/signaling with a client such as, for example, SUCI, UUID, or any other stable/permanent identifier for the client.

Figure 10B:
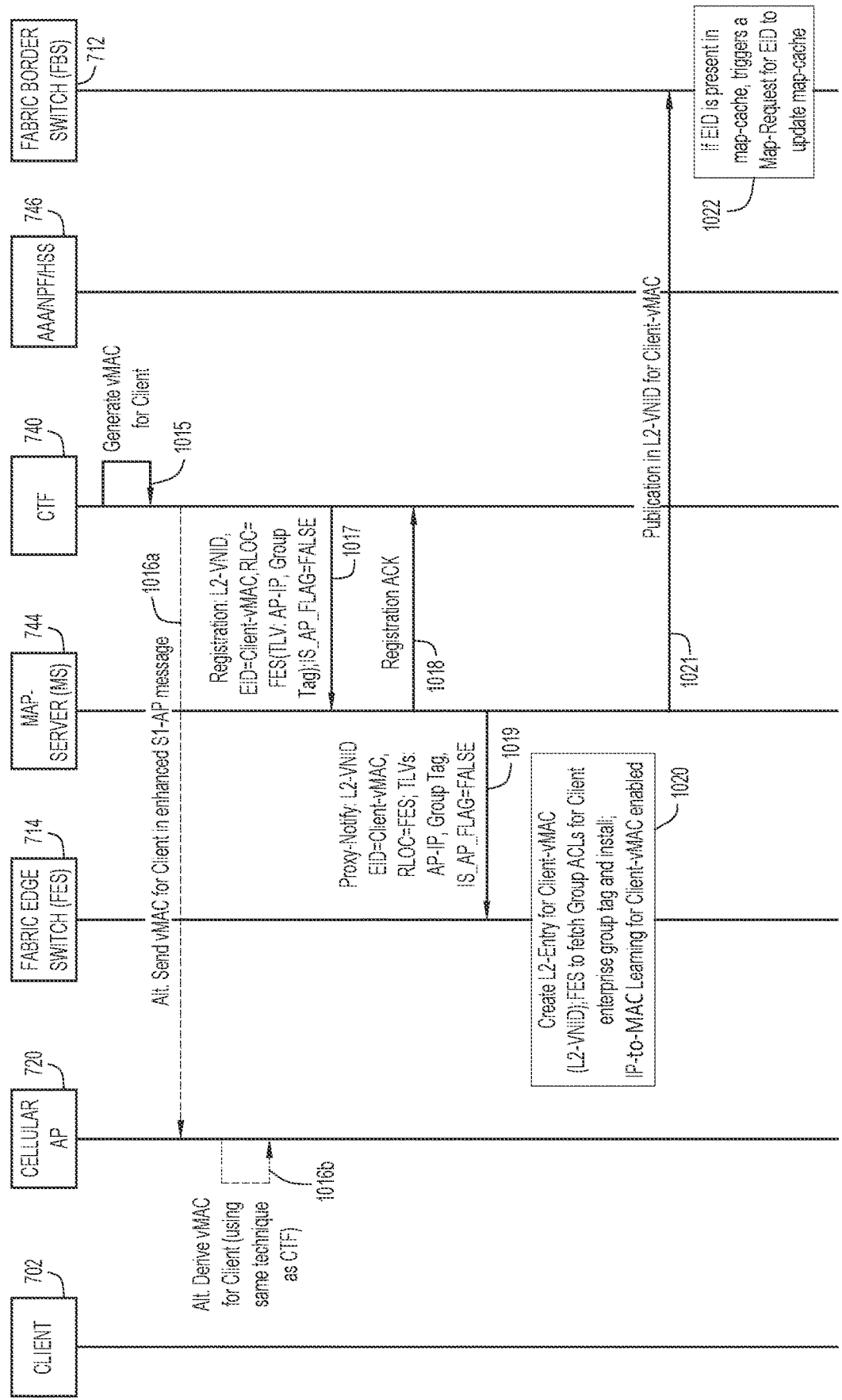

As shown in FIG. 10B at 1015, CTF 740 generates a vMAC address for client 702. CTF 740 can generate a vMAC for each client that seeks to attach to enterprise fabric 710 via the cellular access. The vMAC may be a 48-bit MAC address that can be generated based on the following criteria: a) using an MME Temporary Mobile Subscriber Identity (M-TMSI); a System Architecture Evolution (SAE) Temporary Mobile Subscriber Identity (S-TMSI); or an MME UE S1AP ID (as assigned to the client by the CTF 740) as the seed for generating a hash used for vMAC address generation; b) setting the local bit 'L' to '1' to make the vMAC address unique within the local scope of enterprise fabric 710; and c) ensuring there are no vMAC address conflicts among clients. The local bit 'L'. In one example vMAC address format 1050a, as illustrated in FIG. 10E, Bit 1 (the local bit) labeled 1052a in FIG. 10E in a first octet 1054a of the example vMAC address format 1050a may be set to '1'.

In another example vMAC address format 1050b, the vMAC address may be generated as a 48-bit combination of (i) a 24-bit reserved IEEE organizationally unique identifier (OUI) (shown in FIG. 10E as OUI 1056b) with the local bit (1052b) set to '1', followed by (ii) a 24-bit hash of at least a portion of the M-TMSI or S-TMSI, which may represent a 24-bit extension identifier.

The M-TMSI is used to identify the client within the CTF 740 and is typically 32-bits. The S-TMSI is typically constructed from an MME Code (MMEC) and the M-TMSI. The MME UE S1AP ID can be allocated by CTF 740 and can be used to uniquely identify the client over the S1 interface within the CTF 740. The cellular AP 720 can obtain the MME UE S1AP ID from CTF 740 via S1AP signaling.

The cellular AP 720 is to obtain the vMAC address for the client 702 in order to maintain a mapping between the vMAC address and TEID(s) for bearer(s) established for client 702 (e.g., a default bearer and optionally one or more dedicated bearers) in order to include the vMAC in the Ethernet/MAC header of every uplink user plane packet received from the client 702 that is forwarded to enterprise fabric 710 (e.g., to FES 714). There may be multiple approaches to the vMAC address generation and the cellular AP 720 obtaining the vMAC address. For example, one approach may include the CTF 740 generating the vMAC address for a client (e.g., client 702) and sending the vMAC address for the client 702 to cellular AP 720 over the S1-MME/N2 interface, as shown at 1016a. In another approach, the cellular AP 720 and the CTF 740 may each independently generate the same vMAC address by using the same hash, which may be based the MME UE S1AP ID obtained by the cellular AP 122 over the S1-MME/N2 interface. In yet another approach, the cellular AP 122 may use some stable identifier for the client 102 for vMAC generation.

Continuing with the present example, steps 1017-1035 broadly illustrate example details associated with registering the IP address and MAC address (e.g., vMAC address) for the client 702 with Map-Server 744 as well as configuring the FES 714 and the FBS 712 with mapping information associated with the client 702 to facilitate data plane connectivity for the client 702 with enterprise fabric 710.

For example, at 1017, CTF 740 registers the generated vMAC for client 702 (referred to herein as 'Client-vMAC') as the EID in the L2-VNID space with Map-Server 744 including the following information: EID=Client-vMAC, RLOC=FES(Type-Length-Value (TLV): AP-IP, Group Tag), IS_AP_FLAG=FALSE. At 1018, Map-Server 744 responds with an ACK. At 1017 and 1018, the Map-Server 744 is now aware of the vMAC address, RLOC, and the enterprise group (enterprise group tag) of the client, however, the Map-Server 744 is not aware of the client's IP address.

At 1019, Map-Server 744 sends a Proxy-Notify to FES 714 including the information, which, at 1020, triggers FES 714 to create a L2 entry for the Client-vMAC (in the L2-VNID space). Additionally at 1020, FES 714 fetches the group ACLs for the client enterprise group tag and installs the ACLs. The FES 714 is now aware of the vMAC address and the enterprise group tag of the client 702.

Further, at 1020, FES 714 enables an IP-to-MAC learning process for the client vMAC address in order to determine the IP address associated with the client 702. At 1021, Map-Server 744 performs a Publication in the L2-VNID space for the Client-vMAC, which triggers the FBS 712 to update the EID in its local map-cache as shown at 1022.

In some embodiments, operations may not involve IP-to-MAC learning for a client at FES 714. For example, for deployments utilizing a L3 overlay, there is no MAC or vMAC associated with a client and so consideration involving vMAC to IP relation on the 714 114 is not applicable. For the IP only devices/clients for an L3 overlay, the CTF 740 can push the IP to RLOC relations to Map-Server 744 that, in turn, can push the same to FES 714.

Figure 10C:
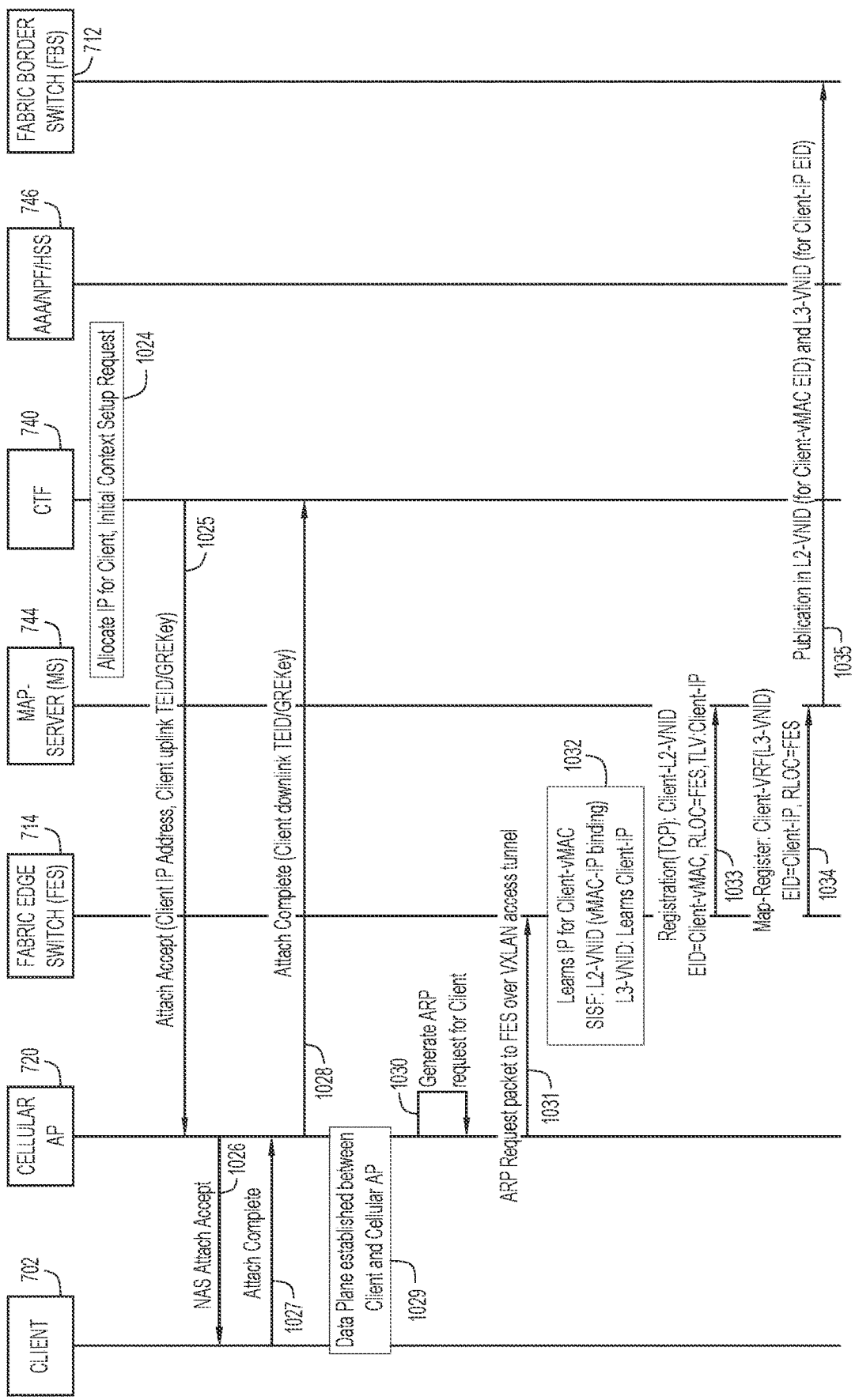

Continuing with the present example, as shown in FIG. 10C at 1024, CTF 740 allocates/obtains an IP address for the client 702, which is also used as the L3 EID for the client 702 (referred to herein as 'Client-IP'). In various embodiments, CTF can allocate/obtain the IP address for client 702 based on IP pools configured for CTF (e.g., IP pools configured for APNs/DNNs, such as 'enterprise.com', etc.) or the IP address can be obtained from a DHCP server on behalf of the client. CTF 740 also triggers an initial context setup request for the client 702, which includes communicating an Attach Accept message to cellular AP 720 at 1025 that includes the IP address allocated for the client 702 and an uplink GPRS Tunnel Endpoint Identifier (TEID)/GRE Key (GREKey). The cellular AP 720 communicates a NAS Attach Accept message to the client 702 at 1026 and the client responds with an Attach Complete message at 1027.

The cellular AP 720 communicates the Attach Complete message to the CTF 740 including a downlink TEID/GREKey at 1028. An Attach Accept or Attach Complete message for 3GPP implementations typically includes a GPRS TEID/GREKey (uplink or downlink) included in a corresponding field of the message. For some embodiments herein, such a TEID/GREKey field may include a bearer indicator such as GTP-U TED or some other bearer indicator for the client 702 session. For embodiments in which a downlink TEID for a bearer may be used as a bearer indicator, the CTF 740 may update a EID-to-RLOC mapping for the client 702 with Map-Server 744, which can push the downlink TEID to FBS 712, using techniques as discussed herein (e.g., via a Publication), and FES 712 may store the bearer indicator in association with the EID-to-RLOC mapping for client 702. Additionally, uplink and/or downlink TEIDs may be pushed to any enterprise fabric 110 data plane nodes, such as FES 714 using techniques as discussed herein.

At 1029, the data plane is established between the client 702 and the cellular AP 720. For some implementations of the IP-to-MAC learning operations involving FES 714 the cellular AP 720 at 1030 may generates a gratuitous ARP request on behalf of the client 702 and sends an ARP request message (packet) over the VXLAN access tunnel 722 to FES 714, as shown at 1031. The packet includes the IP address and the vMAC of the client 702. The message is obtained by the FES 714, which at 1032 learns the IP address for the vMAC of the client, that includes a Switch Integrated Security Feature (SISF) performing a L2-VNID vMAC to IP binding and L3-VNID learning the client IP and thus completes the IP-to-MAC learning process for the client 702 IP address by the FES 714.

In other implementations, the cellular AP 720 can send a Proxy ARP request for the gateway's IP over the VXLAN access tunnel in which the request ARP message can include the IP address and the vMAC address of the client 702 such that the FES 714 may be made aware of the IP/vMAC of the client.

At 1033, the FES 714 performs a Transmission Control Protocol (TCP)-based registration with Map-Server 744 in which the L2-VNID space includes the EID=Client-vMAC and RLOC=FES-IP, TLV: Client-IP. At 1034, FES 714 performs a registration with Map-Server 744 in which the L3-VNID space includes the EID=Client-IP and RLOC=FES-IP for virtual routing and forwarding (VRF). The Map-Server 744 now has a MAC-RLOC map entry for the client 702. At 1035, Map-Server 744 performs a Publication in the L2-VNID space for the Client-vMAC EID and in the L3-VNID space for the Client-IP EID, which triggers the FBS 712 to update the EID-to-RLOC mapping for client 702 in its local map-cache.

As noted above, a vMAC address is not an actual predetermined (e.g., factory set, etc.) MAC address of a client, but rather an artificial MAC address that may be created to satisfy operational features for forwarding traffic for the client via enterprise fabric 710. Although details for FIGS. 10A, 10B, 10C, 10D, and 10E may be associated with generating a vMAC for client 702, in some embodiments, a L3 overlay may be provided for enterprise fabric 110 in which no vMAC is generated for client 102; rather, a dummy MAC may be defined that can be utilized, as discussed above in which the dummy MAC can be used to indicate to the edge switch that the access tunnel lookup is to be performed based on IP address of the client 702 and not a MAC address of the client.

For embodiments in which no vMAC address is generated for the client 702, such as for an L3 overlay implementation, no EID-to-RLOC mapping for the client vMAC may be registered with Map-Server 744; thus, operations as discussed at 1015, 1016*a*/1016*b*, 1017, 1018, 1019, 1020, 1021, and 1022 and also corresponding IP-to-MAC learning operations as discussed at 1030, 1031, 1032, 1033, 1034, and 135 may be eliminated with the exception that FES 714 is still to fetch and install the enterprise group ACLs for the client 702 enterprise group. For such embodiments, an EID-to-RLOC mapping for client 702 can be registered in the L3-VNID space for Map-Server 744, which information can be pushed to FES 714 and FBS 712 to facilitate VXLAN fabric tunnel 716 connectivity for client 702.

Returning to the present example, as illustrated in FIG. 10D at 1036 for the present example, if this is the first client session in the cellular AP, the cellular AP 720 can create/set the VXLAN access tunnel 722 to FES 714. The cellular AP 720 is to know the client 702 VNID and the VXLAN access tunnel 722 IP address (e.g., the IP address for FES 714). In one embodiment, both can be configured in the cellular AP 720. In yet another embodiment, the VXLAN access tunnel IP address can be obtained from the S1-U IP address (as discussed at 905*b* of FIG. 9A).

At 1037, the cellular AP creates/maintains a mapping between the TEID and vMAC (if used) and/or IP address for the client 702. In general, the cellular AP 720 will maintain a relation between the client vMAC (if used) and/or IP address and elements that can be used for bearer identification such as GPRS TEIDs, radio access bearer (RAB) identifiers (RAB IDs), IDs, etc. As there may be multiple TEIDs for a client based on the bearers created for the client (e.g., a default bearer and optionally one or more dedicated bearers), the cellular AP 720 can distinguish a corresponding RAB ID for downlink packets that are to be transmitted to the client based on the 'hint' or bearer indicator included in the VXLAN header for a downlink packet received from FBS 712.

At 1038, the data plane is established between the cellular AP 720 and the FES 714. In summary, data plane connectivity 1039 (also shown as 704 in FIG. 7) for client 702 may be provided for enterprise fabric 710 via a cellular access according to techniques presented herein, as illustrated in the example details of FIGS. 10A-10F, which may include an air interface connection (e.g., a RAB) between client 702 and cellular AP 720, the VXLAN access tunnel provided between cellular AP 720 and FES 714, and the VXLAN fabric tunnel 716 provided between FES 714 and FBS 712, which may provide connectivity to one or more data network(s) 730.

In general downlink packet forwarding operations utilizing techniques provided herein may include FBS 712, on receiving a downlink IP packet from a correspondent node, application, etc. outside the enterprise fabric 710 domain with a destination IP address matching the Layer-3 EID (IPv4 or IPv6 address) of the client 702, the FBS 712 will perform a look-up using its local map-cache to determine an EID-to-RLOC mapping for that EID entry. If there is no map-cache entry, the FBS 712 can query the Map-Server 744 to obtain the RLOC along with the Layer-2 EID of the client (if vMAC is used).

Upon determining the EID-to-RLOC mapping for client 702, the FBS 712 can encapsulate the downlink packet in a VXLAN tunnel encapsulation and can forward the encapsulated packet toward the RLOC via a VXLAN fabric tunnel, for example, FES 714 via VXLAN fabric tunnel 716. An outer IP header of the encapsulated packet will have the RLOC as the destination IP address and the source address reflecting the RLOC of the BN. Other information can be provided in the VXLAN encapsulation in various embodiments, such as a bearer indicator, associated/stored with the EID-to-RLOC mapping. This packet can be routed in the fabric data plane (e.g., via routers, etc., not shown for purposes of brevity only, that can be provided in enterprise fabric 710) towards the access switch, FES 714 in this example.

On obtaining the encapsulated downlink packet via the VXLAN fabric tunnel 716, FES 714, can copy/identify information from the encapsulation and perform an access tunnel lookup based on the vMAC of the client 702 (for L2 overlays)/IP address of the client 702 (for L3 overlays). Upon identifying the VXLAN access tunnel, VXLAN access tunnel 722 in this example, FES 714 can provide a VXLAN tunnel encapsulation for the downlink packet that includes the outer IP header of the encapsulated packet having a destination IP address set to the IP address of cellular AP 720 and a source IP address set to the IP address (RLOC) of FES 714 and the source address/RLOC of the FES 714. The bearer indicator may also be included in encapsulation for the downlink packet. FES 714 can forward the encapsulated packet toward cellular AP 720 via the VXLAN access tunnel 720.

On obtaining the encapsulated downlink packet via the VXLAN access tunnel 722, cellular AP 720 can identify the radio access bearer upon which to transmit the downlink packet to the client 702 based on the bearer indicator included in the VXLAN encapsulation and can transmit the downlink packet to the client 702 using the identified radio access bearer.

In addition to data plane connectivity, features as discussed herein, an edge/access switch, such as FES 714 may also perform features such as accounting. For example, FES 714 can generate reports that may include extensive details relating to flows, bandwidth consumed, etc. This data, when correlated with client session information, can be used to generate detailed reports on data consumption (potentially including much more detail than is typically included in 3GPP accounting). Additionally, in some embodiments features such as lawful intercept can be enabled on edge/access switches.

Figure 10F:
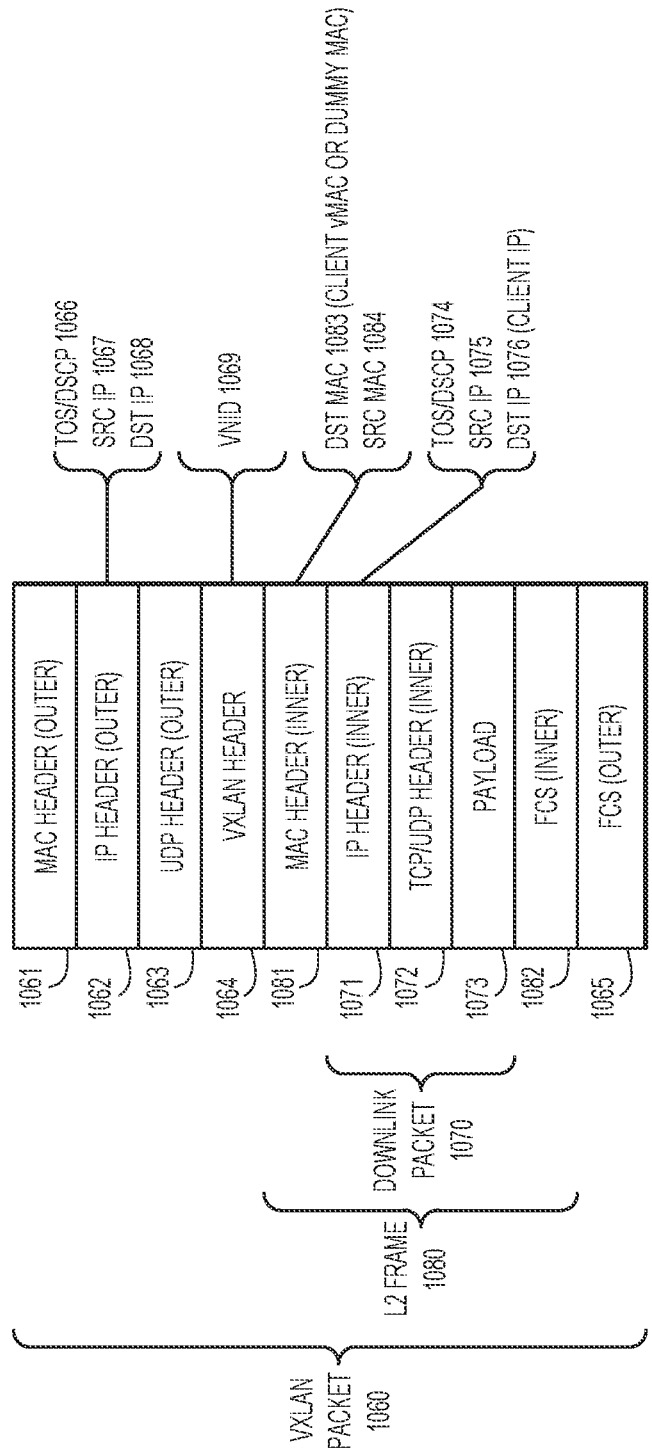
FIG. 10F is a schematic diagram illustrating example details of an example Virtual Extensible Local Area Network (VXLAN) tunnel encapsulation that may be provided for a downlink packet via the system of FIG. 7, according to an example embodiment.

Referring to FIG. 10F, FIG. 10F is a schematic diagram illustrating example details of an example VXLAN tunnel encapsulation that may be provided for a downlink packet via system 700 of FIG. 7. In particular, FIG. 10F is a schematic diagram illustrating example details associated with a VXLAN tunnel encapsulation of a downlink packet 1070, which provides a VXLAN packet 1060 (also referred to interchangeably as a VXLAN frame) that can be forwarded within system 700 (e.g., from FBS 712 to FES 714). Although FIG. 10F is discussed with reference to a downlink packet, it is to be understood that similar fields may be for an uplink packet transmitted from a client (e.g., client 702) towards cellular AP 720 connected to enterprise fabric 710 with appropriate fields set to provide for communicating the packet across the enterprise fabric to one or more data network(s) 730.

Features associated with a Layer 2 (L2) frame 1080 and a downlink packet 1070, discussed below, may be referred to using an 'inner' nomenclature while features associated with the VXLAN packet 1060 may be referred to using an 'outer' nomenclature.

A downlink packet, such as downlink packet 1070 may be encapsulated within the L2 frame 1080 (e.g., an Ethernet frame) in which downlink packet 1070 may include an inner IP header 1071, an inner TCP or UDP header 1072, and a payload 1073. The IP header 1071 may include various fields including, but not limited to, a Type of Service (TOS)/Differentiated Services Code Point (DSCP) field 1074, a source (SRC) IP address field 1074, and a destination (DST) IP address field 1075.

The DST IP address field 1076 of a downlink packet, such as downlink packet 1070, can include the IP address of a given client, such as client 702, to which the downlink packet is to be delivered. The SRC IP address field 1075 can include the IP address of the source of the packet, such as an application (not shown), etc. within data network(s) 730 from which the downlink packet 1070 may be received by FBS 712. In some instances, QCI can be mapped into DSCP that can be carried in one or more bits of the TOS/DSCP field 1074 of downlink packet 1070. The mapping for different QCI values to TOS/DSCP values can be based on standardized mapping techniques as may be prescribed at least by 3GPP TS 23.203, RFC 7222, and Global System for Mobile Communications Association (GSMA) IR.34 Specification.

L2 frame 1080 may include an inner MAC header 1081 and an inner Frame Check Sequence (FCS) 1082. The inner MAC header 1081 may include various fields including, but not limited to, a DST MAC address field 1083 and a SRC MAC address field 1084. In accordance with techniques discussed herein, the DST MAC address field 233 may, in some embodiments, be set to a vMAC address for a client to which the downlink packet is to be delivered, such as client 702. In other embodiments, the DST MAC address field 233 may be set to a dummy MAC address, as discussed herein.

The VXLAN packet 1060 may include an outer MAC header 1061, an outer IP header 1062, an outer UDP header 1063, a VXLAN header 1064, and an outer FCS 1065. Generally, the outer MAC header 1061 may include source and destination MAC addresses to facilitate hop-by-hop forwarding across enterprise fabric 710. The outer IP header 1062 may include various fields including, but not limited to, a TOS/DSCP field 1066, a SRC IP address field 1067, and a DST IP address field 1068.

In some instances, a QCI for a particular downlink traffic flow for a client (e.g., client 702) for can be set in one or more bits of the TOS/DSCP field 1066 of the IP header 1062 for the VXLAN packet 1060. The SRC IP address field 1067 can include the IP address of the source from which the VXLAN packet 1060 was encapsulated/transmitted. The DST IP address field 1068 can include the IP address of the destination at which the VXLAN packet 1060 is to be received. For example, for a downlink packet that is received by FBS 712, a VXLAN tunnel encapsulation can be provided for the downlink packet such that a VXLAN packet may include a SRC IP address set to an IP address for FBS 712 and a DST IP address set to an IP address for FES 714, as discussed above.

The VXLAN header 1064 may include a VXLAN Network Identifier (VNID) field 1069. In some embodiments, a bearer 'hint' or bearer indicator may be included in the VXLAN header 1064 for downlink packets to be delivered to a particular client for a given bearer (e.g., a default bearer or dedicated bear for client 702) to enable the cellular AP 720 to identify an appropriate radio access bearer upon which to transmit data to the client. In at least one embodiment, a bearer indicator may be a GTP-U TED generated for a given radio access bearer (default or dedicated) created/established for client 702 via cellular AP 720.

In some embodiments, a bearer indicator may be set in the VNID field 1069 of VXLAN packet 1060. The VXLAN header 1064 typically includes other fields such as reserved fields and the like in which a bearer indicator may be set, in some embodiments. In other embodiments, a specific bearer indicator field may be defined for the VXLAN header 1064 in which a bearer indicator for a corresponding bearer can be set for a given downlink packet. For example, if each client in a system may have a maximum of nine (9) bearers, then a 4-bit field may be utilized for carrying the bearer indicator.

These examples of bearer indicators and fields of a VXLAN header in which a bearer indicator may be set are only a few of the many different types of indicators/fields that may be utilized to provide an end-to-end bearer indication for packets forwarded across an enterprise fabric and are not meant to limit the broad scope of the present disclosure. Virtually any other types of indicators and/or fields may be utilized for any type of tunnel encapsulation in order to facilitate end-to-end data plane connectivity for a client via enterprise fabric 710.

Figure 11:
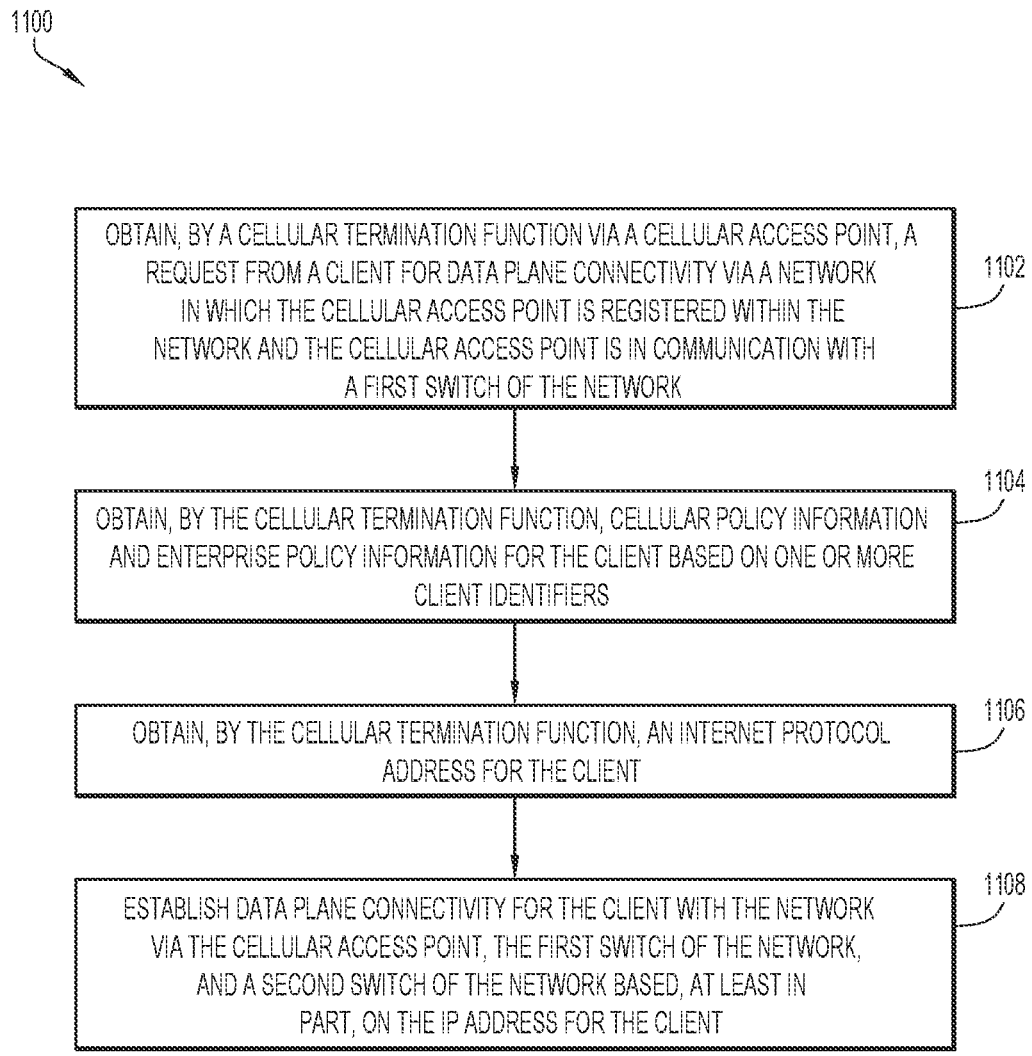
FIG. 11 is a flow chart depicting a method according to an example embodiment.

Referring to FIG. 11, FIG. 11 is a flowchart depicting a method 1100 according to an example embodiment. In at least one embodiment, method 1100 may be associated with operations that may be performed, at least in part, by a cellular termination function (e.g., CTF 740) associated with establishing data plane connectivity for a client (e.g., client 702) seeking to connect to a network (e.g., enterprise fabric 710) via a cellular access (e.g., cellular AP 720).

At 1102, the method may include obtaining, by the cellular termination function via the cellular AP, a request from the client for data plane connectivity via the network, in which the cellular access point is registered within the network and the cellular access point is in communication with a first switch (e.g., FES 714) of the network. For example, the cellular AP can be registered within the enterprise fabric via a Map-Server (e.g., Map-Server 744) based on EID-to-RLOC mappings registered with the Map-Server by CTF 740.

At 1104, the method may include obtaining, by the cellular termination function, cellular policy information and enterprise policy information for the client based on one or more client identifiers. For example, the cellular termination function can determine cellular policy information and enterprise policy information for the client based on an exchange with any of an AAA, an NPF, and/or an HSS using a cellular-based identifier for the client, such as IMSI, NAI, SUCI, etc. At 1106, the method may include obtaining, by the cellular termination function, an IP address for the client (e.g., based on IP pools, DHCP exchanges, etc.).

At 1108, the method may include establishing data plane connectivity for the client with the network via the cellular access point, the first switch of the network and a second switch of the network (e.g., FBS 712) in which the second switch connects the networks with one or more data networks. In at least one embodiment, establishing data plane connectivity for the client with the network may include creating, by the first switch, an access tunnel (e.g., VXLAN access tunnel 722) between the first switch and the cellular access point. In at least one embodiment, establishing data plane connectivity for the client with the network may include providing a fabric tunnel (e.g., VXLAN fabric tunnel 716) between the first switch of the network and the second switch of the network and determining/configuring EID-to-RLOC mappings as described herein.

In at least one embodiment, establishing data plane connectivity for the client with the network may include obtaining, by the cellular access point, an indicator (e.g., GTP TEID) associated with an air interface connection between the cellular access point and the client; and maintaining, by the cellular access point, a mapping between at least one of the IP address for the client or a MAC address (e.g., vMAC address) for the client and the indicator.

Figure 12:
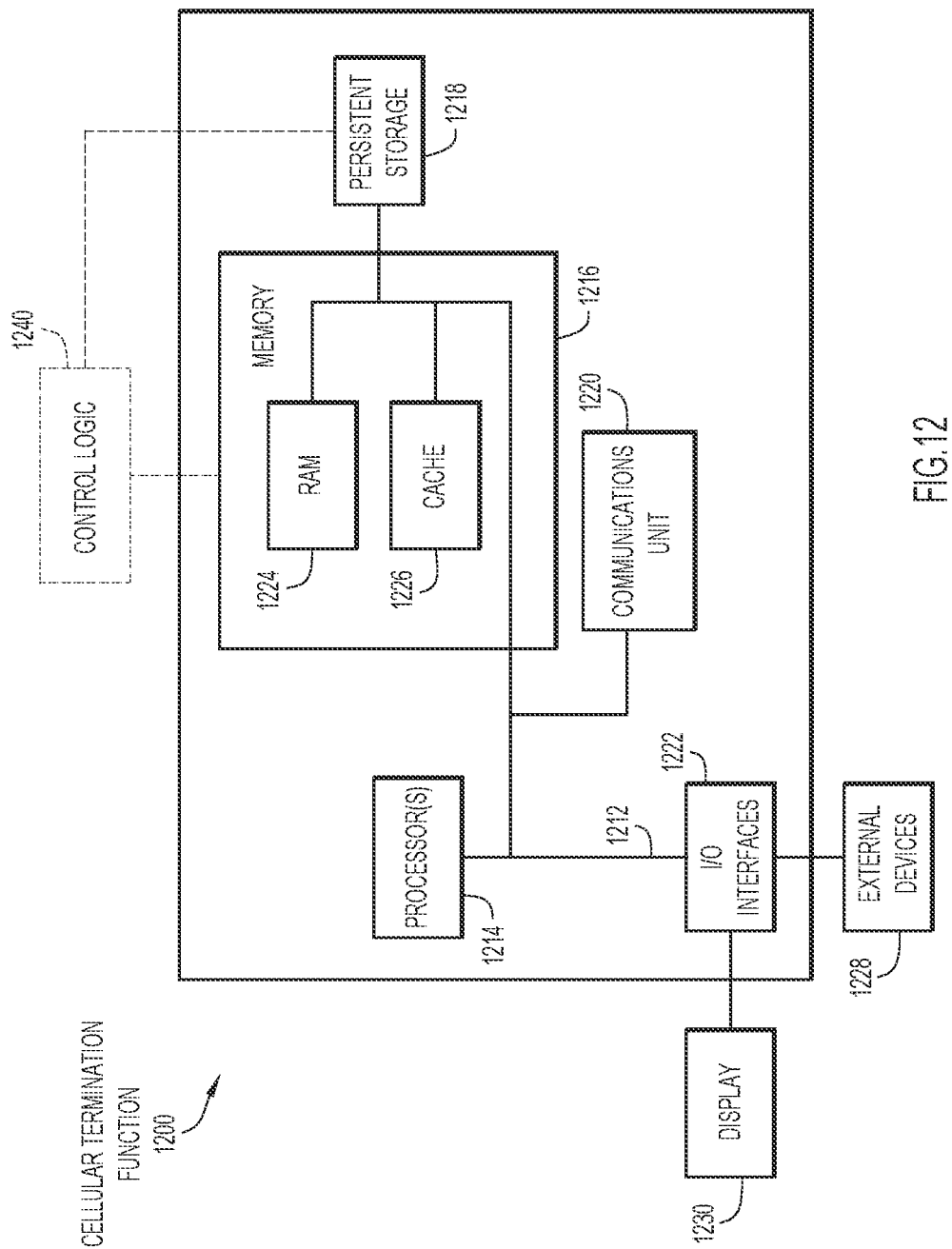
FIG. 12 is a hardware block diagram of a cellular termination function that may participate in cellular access operations described herein, according to an example embodiment.

Referring to FIG. 12, FIG. 12 is a hardware block diagram of a cellular termination function 1200 that may participate in authentication and subscription management operations according to an example embodiment. In at least one embodiment, cellular termination function 1200 may be representative of a configuration of CTF 740 of FIG. 7 discussed herein. It should be appreciated that FIG. 12 provides only an illustration of one embodiment and does not imply any limitations with regard to the environments in which different embodiments may be implemented. Many modifications to the depicted environment may be made.

As depicted, the cellular termination function 1200 includes a bus 1212, which provides communications between computer processor(s) 1214, memory 1216, persistent storage 1218, communications unit 1220, and input/output (I/O) interface(s) 1222. Bus 1212 can be implemented with any architecture designed for passing data and/or control information between processors (such as microprocessors, communications and network processors, etc.), system memory, peripheral devices, and any other hardware components within a system. For example, bus 1212 can be implemented with one or more buses.

Memory 1216 and persistent storage 1218 are computer readable storage media, which can be inclusive on non-transitory computer readable storage media. In the depicted embodiment, memory 1216, which may be inclusive of one or more memory element(s), may include random access memory (RAM) 1224 and cache memory 1226. In general, memory 1216 can include any suitable volatile or non-volatile computer readable storage media. Instructions for control logic 1240 may be stored in memory 1216 and/or persistent storage 1218 for execution by processor(s) 1214. When the processor(s) 1214 execute control logic 1240, the processor(s) 814 are caused to perform the operations described above in connection with FIGS. 7, 9A-9B, 10A-10D, and 11 (e.g., registering a cellular AP within the enterprise fabric, generating a vMAC for a client, obtaining cellular and enterprise policy information for a client, registering Layer 2 and Layer 3 fabric identifiers (EIDs) for the client within the Map-Server, combinations thereof, and/or the like as discussed herein).

One or more programs and/or other logic may be stored in persistent storage 1218 for execution by one or more of the respective computer processors 1214 via one or more memory elements of memory 1216. The persistent storage 1218 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 1218 may also be removable. For example, a removable hard drive may be used for persistent storage 1218. Other examples include optical and magnetic disks, thumb drives, and smart cards that are inserted into a drive for transfer onto another computer readable storage medium that is also part of persistent storage 1218.

Communications unit 1220, in these examples, provides for communications with other data processing systems or devices (e.g., via any appropriate interfaces). Communications unit 1220 may provide communications through the use of either or both physical and wireless communications links.

I/O interface(s) 1222 allows for input and output of data with other devices that may be connected to cellular termination function 1200. For example, I/O interface 1222 may provide a connection to external devices 1228 such as a keyboard, keypad, a touch screen, and/or some other suitable input device. External devices 1228 can also include portable computer readable storage media such as database systems, thumb drives, portable optical or magnetic disks, and memory cards.

Software and data used to practice embodiments can be stored on such portable computer readable storage media and can be loaded onto persistent storage 1218 via I/O interface(s) 1222. I/O interface(s) 1222 may also connect to a display 1230. Display 1230 provides a mechanism to display data to a user and may be, for example, a computer monitor.

Figure 13:
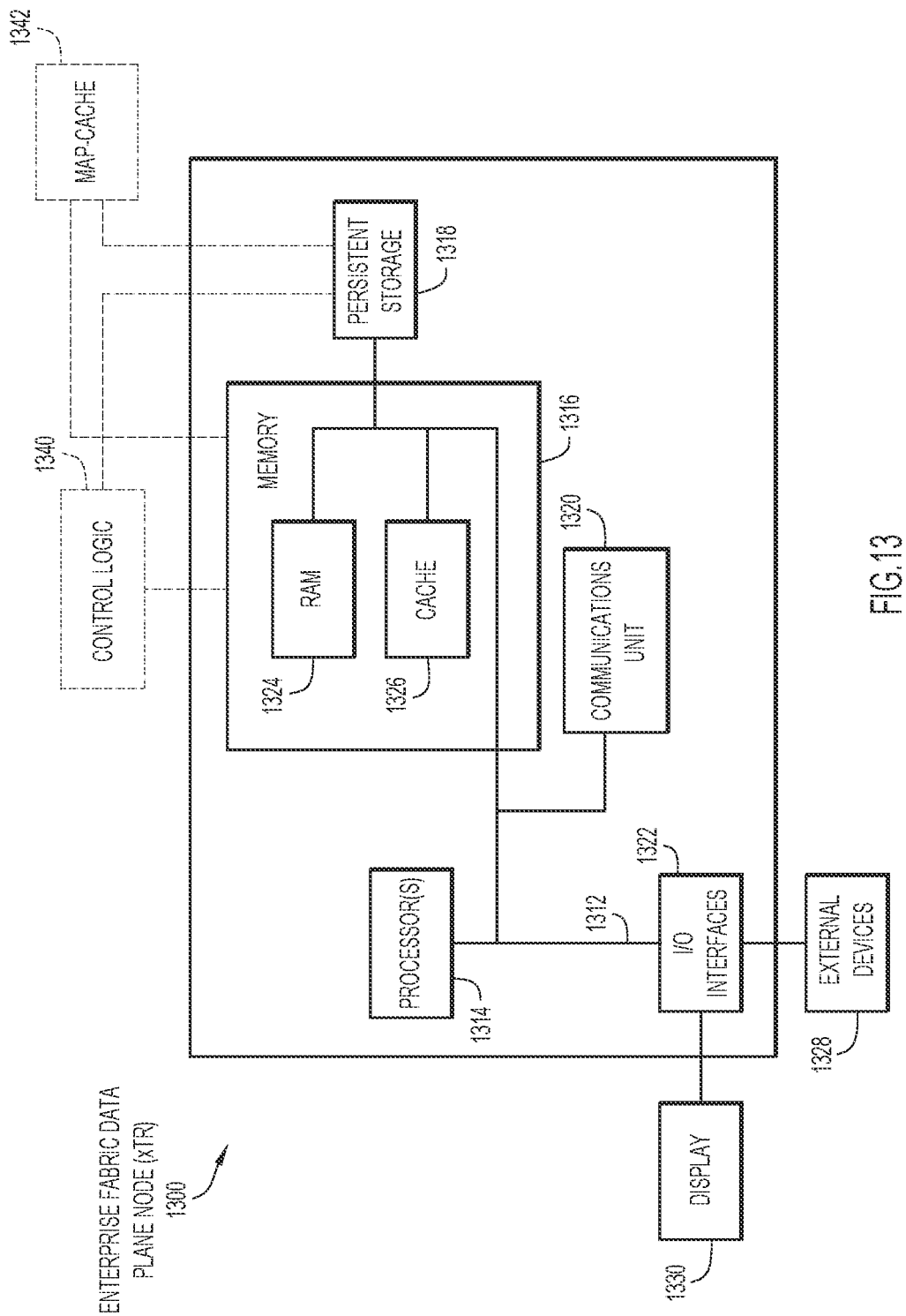
FIG. 13 is a hardware block diagram of a fabric data plane node that may participate in cellular access operations described herein, according to an example embodiment.

Referring to FIG. 13, FIG. 13 is a hardware block diagram of an enterprise fabric data plane node 1300 that may participate in operations associated with extending cellular QoS bearers through an enterprise fabric, according to an example embodiment. In at least one embodiment, enterprise fabric data plane node 1300 may be representative of a configuration of node that may provide xTR routing functionality (e.g., ingress/egress routing) for an enterprise fabric such as FBS 712 or FES 714 of FIG. 7 discussed herein. It should be appreciated that FIG. 13 provides only an illustration of one embodiment and does not imply any limitations with regard to the environments in which different embodiments may be implemented. Many modifications to the depicted environment may be made.

As depicted, the enterprise fabric data plane node 1300 includes a bus 1312, which provides communications between computer processor(s) 1314, memory 1316, persistent storage 1318, communications unit 1320, and input/output (I/O) interface(s) 1322. Bus 1312 can be implemented with any architecture designed for passing data and/or control information between processors (such as microprocessors, communications and network processors, etc.), system memory, peripheral devices, and any other hardware components within a system. For example, bus 1012 can be implemented with one or more buses.

Memory 1316 and persistent storage 1318 are computer readable storage media, which can be inclusive on non-transitory computer readable storage media. In the depicted embodiment, memory 1316, which may be inclusive of one or more memory element(s), may include random access memory (RAM) 1324 and cache memory 1326. In general, memory 1316 can include any suitable volatile or non-volatile computer readable storage media. Instructions for control logic 1340 may be stored in memory 1316 and/or persistent storage 1318 for execution by processor(s) 1314. In at least one embodiment, one or more EID-to-RLOC mappings may be stored in a map-cache 1342 that may be provided via memory 1316 and/or persistent storage 1318 to facilitate operations described herein. When the processor(s) 1314 execute control logic 1340, the processor(s) 1314 are caused to perform the operations described herein in connection with providing data plane connectivity with enterprise fabric for one or more clients (e.g., maintaining/updating local map-cache 1342 for one or more EID-to-RLOC mappings for one or more clients/endpoints, providing VXLAN tunnel encapsulations for packets, forwarding encapsulated packets to a corresponding RLOC for packet delivery to a client, etc., performing control plane signaling with a Map-Server, etc., combinations thereof, and/or the like as discussed herein).

One or more programs and/or other logic may be stored in persistent storage 1318 for execution by one or more of the respective computer processors 1314 via one or more memory elements of memory 1316. The persistent storage 1318 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 1318 may also be removable. For example, a removable hard drive may be used for persistent storage 1318. Other examples include optical and magnetic disks, thumb drives, and smart cards that are inserted into a drive for transfer onto another computer readable storage medium that is also part of persistent storage 1318.

Communications unit 1320, in these examples, provides for communications with other data processing systems or devices (e.g., via any appropriate interfaces). Communications unit 1320 may provide communications through the use of either or both physical and wireless communications links.

I/O interface(s) 1322 allows for input and output of data with other devices that may be connected to enterprise fabric data plane node 1300. For example, I/O interface 1322 may provide a connection to external devices 1328 such as a keyboard, keypad, a touch screen, and/or some other suitable input device. External devices 1328 can also include portable computer readable storage media such as database systems, thumb drives, portable optical or magnetic disks, and memory cards.

Software and data used to practice embodiments can be stored on such portable computer readable storage media and can be loaded onto persistent storage 1318 via I/O interface(s) 1322. I/O interface(s) 1322 may also connect to a display 1330. Display 1330 provides a mechanism to display data to a user and may be, for example, a computer monitor.

In various embodiments, any other element, function, node, etc. discussed for embodiments described herein (e.g., client 702, cellular APs 120 and 720, WLAN AP 724, WLC 742, Map-Server 744, AAA/NPF/HSS 746, etc.) may be configured with any combination of appropriate hardware (e.g., processor(s), memory element(s) etc.), software, logic, and/or the like similar to that as described for FIG. 12. In addition, in some embodiments, air interface devices such as client 702, cellular APs 120 and 720, WLAN AP 724, and/or the like discussed herein may additionally and/or alternatively include any other hardware, software, logic, and/or the like (e.g., RF receivers, RF transmitters, RF transceivers, antennas and/or antenna arrays, baseband processors (modems), etc.) in order to perform operations as discussed for various embodiments described herein.

In summary, techniques presented herein provide for the addition or integration of private LTE/5G and CBRS access methods into an enterprise fabric by enabling VXLAN and address allocation techniques into a cellular user plane anchor function, such as a cellular termination function. Stated differently, techniques presented herein may provide for various features including, but not limited to: providing for different deployment models for the providing cellular access in an enterprise fabric; facilitating converged WLAN/cellular/wired access via integration with a unified service and policy layer (e.g., AAA/NPF/HSS); coupling the 3GPP control plane with the fabric user plane based on LISP via a cellular termination function (e.g., a 3GPP fabric anchor, such as control plane entity or function CTF 740) within an enterprise fabric; providing interworking between the cellular termination function and a LISP Map-Server for user plane forwarding setup (e.g., EID-to-RLOC mappings) providing various VXLAN tunnels such as access tunnels and fabric tunnels for data plane connectivity using Layer 2 or Layer 3 overlay deployments; providing packet steering via fabric border and edge nodes to steer packets to clients; eliminating 3GPP UPFs or other dedicated 3GPP user plane nodes from an enterprise fabric; and/or applying enterprise service features on edge and border nodes of an enterprise fabric.

In at least one form, a computer-implemented method is provided that may include obtaining, by a cellular termination function via a cellular access point, a request from a client for data plane connectivity via a network, wherein the cellular access point is registered within the network and the cellular access point is in communication with a first switch of the network; obtaining, by the cellular termination function, cellular policy information and enterprise policy information for the client based on one or more client identifiers; obtaining, by the cellular termination function, an Internet Protocol (IP) address for the client; and establishing data plane connectivity for the client with the network via the cellular access point, the first switch of the network, and a second switch of the network based, at least in part, on the IP address for the client, wherein the second switch connects the network with one or more data networks.

The one or more client identifiers may include at least one of: an International Mobile Subscriber Identity (IMSI); a Network Address Identifier (NAI); a Subscription Concealed Identifier (SUCI); a Permanent Equipment Identifier (PEI); and a Universally Unique Identifier (UUID). The cellular policy information and the enterprise policy information may be obtained from a function of the network. The cellular policy information for the client may include quality information for at least one data flow of the client that is used to enforce a cellular policy within the network for the at least one data flow. The enterprise policy information for the client comprises an enterprise group identifier associated with a group access control list used to enforce an enterprise policy within the network for the client.

In at least one implementation, the method may further include generating a virtual Media Access Control (vMAC) address for the client by the cellular termination function based on one of: a Mobility Management Entity (MME) Temporary Mobile Subscriber Identity (M-TMSI); and a System Architecture Evolution (SAE) Temporary Mobile Subscriber Identity (S-TMSI). In at least one implementation, the method may further include sending the vMAC address for the client to the cellular access point; and generating the vMAC address for the client by the cellular access point based on an identifier for the client obtained by the cellular access point from the cellular termination function.

In at least one implementation, the cellular access point may be registered with a Locator/Identity Separation Protocol (LISP) Map-Server within the network based on a Media Access Control (MAC) address generated for the cellular access point and an IP address provided for the cellular access point by the first switch.

In at least one implementation, establishing data plane connectivity for the client may further include: creating, by the first switch, an access tunnel between the first switch and the cellular access point. In at least one implementation, the access tunnel may be a Virtual Extensible Local Area Network (VXLAN) tunnel. In at least one implementation, establishing data plane connectivity for the client may further include: obtaining, by the cellular access point, an indicator associated with an air interface connection between the cellular access point and the client; and maintaining, by the cellular access point, a mapping between at least one of the IP address for the client or a Media Access Control (MAC) address for the client and the indicator. In at least one implementation, the indicator associated with the air interface connection may be a General Packet Radio Service (GPRS) Tunneling Protocol (GTP) Tunnel Endpoint Identifier (TED) associated with a radio access bearer established for the client. In at least one implementation, the cellular termination function is integrated within the network.

In at least one embodiment, establishing data plane connectivity for the client may further include providing a fabric tunnel between the first switch of the network and the second switch of the network. In at least one implementation, the fabric tunnel may be a Virtual Extensible Local Area Network (VXLAN) tunnel.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. In general, packet is a formatted unit of data that can contain control or routing information (e.g., source and destination address, source and destination port, etc.) and a payload (e.g., data, signaling, instructions, and/or the like), which is also sometimes referred to as a data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks. IP addresses as discussed for embodiments described herein may be implemented as IP version 4 (IPv4) and/or IP version 6 (Ipv6) addresses.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to user/device converged access profiles, policy information, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), wireless LAN (WLAN), Wide Area Network (WAN), Ethernet network, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WLAN, WAN, Ethernet network, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, WLAN, hardwire, wireless link, Ethernet network, Intranet, etc.).

A system or computing device may employ any number of any conventional or other databases, data stores or storage structures (e.g., files, databases, data structures, data or other repositories, etc.) to store information (e.g., data relating to user/device converged access profiles, policy information, fabric identifiers, RLOCs, EIDs, etc.). The database system may be implemented by any number of any conventional or other databases, data stores or storage structures (e.g., files, databases, data structures, data or other repositories, etc.) to store information (e.g., data relating to user/device converged access profiles, policy information, fabric identifiers, RLOCs, EIDs, etc.). A database system may be included within or coupled to a server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++ and/or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   registering, via a cellular termination function, a cellular access point in a network, wherein the registering is based on a Media Access Control (MAC) address and an Internet Protocol (IP) address for the cellular access point and the cellular access point is in communication with a first switch of the network;
   obtaining, by the cellular termination function via the cellular access point, a request from a client for data plane connectivity via the network;
   obtaining, by the cellular termination function, cellular policy information and enterprise policy information for the client based on one or more client identifiers;
   obtaining, by the cellular termination function, an IP address for the client; and
   establishing data plane connectivity for the client with the network via the cellular access point, the first switch of the network, and a second switch of the network based, at least in part, on the IP address and the enterprise policy information for the client, wherein the second switch connects the network with one or more data networks and the data plane connectivity for the client includes an access tunnel provided between the cellular access point and the first switch.

2. The method of claim 1, wherein the one or more client identifiers include at least one of:
   an International Mobile Subscriber Identity (IMSI);
   a Network Address Identifier (NAI);
   a Subscription Concealed Identifier (SUCI);
   a Permanent Equipment Identifier (PEI); and
   a Universally Unique Identifier (UUID).

3. The method of claim 1, wherein the cellular policy information and the enterprise policy information are obtained from a function of the network.

4. The method of claim 1, wherein the cellular policy information for the client comprises quality information for at least one data flow of the client that is used to enforce a cellular policy within the network for the at least one data flow.

5. The method of claim 1, wherein the enterprise policy information for the client comprises an enterprise group identifier associated with a group access control list used to enforce an enterprise policy within the network for the client.

6. The method of claim 1, further comprising:
   generating a virtual Media Access Control (vMAC) address for the client by the cellular termination function based on one of:
   a Mobility Management Entity (MME) Temporary Mobile Subscriber Identity (M-TMSI); and
   a System Architecture Evolution (SAE) Temporary Mobile Subscriber Identity (S-TMSI).

7. The method of claim 6, further comprising one of:
   sending the vMAC address for the client to the cellular access point; and generating the vMAC address for the client by the cellular access point based on an identifier for the client obtained by the cellular access point from the cellular termination function.

8. The method of claim 1, wherein the registering includes registering the cellular access point with a Locator/Identity Separation Protocol (LISP) Map-Server within the network based on the MAC address and the IP address for the cellular access point.

9. The method of claim 1, wherein establishing data plane connectivity for the client further comprises:
creating, by the first switch, the access tunnel between the first switch and the cellular access point.

10. The method of claim 9, wherein the access tunnel is a Virtual Extensible Local Area Network (VXLAN) tunnel.

11. The method of claim 1, wherein establishing data plane connectivity for the client further comprises:
obtaining, by the cellular access point, an indicator associated with an air interface connection between the cellular access point and the client; and
maintaining, by the cellular access point, a mapping between at least one of the IP address for the client or a Media Access Control (MAC) address for the client and the indicator.

12. The method of claim 11, wherein the indicator associated with the air interface connection is a General Packet Radio Service (GPRS) Tunneling Protocol (GTP) Tunnel Endpoint Identifier (TEID) associated with a radio access bearer established for the client.

13. The method of claim 11, wherein the cellular termination function is integrated within the network.

14. The method of claim 1, wherein establishing data plane connectivity for the client further comprises:
providing a fabric tunnel between the first switch of the network and the second switch of the network.

15. The method of claim 14, wherein the fabric tunnel is a Virtual Extensible Local Area Network (VXLAN) tunnel.

16. One or more non-transitory computer readable storage media encoded with instructions that, when executed by a processor, cause the processor to perform operations, comprising:
registering, via a cellular termination function, a cellular access point in a network, wherein the registering is based on a Media Access Control (MAC) address and an Internet Protocol (IP) address for the cellular access point and the cellular access point is in communication with a first switch of the network;
obtaining, by the cellular termination function via the cellular access point, a request from a client for data plane connectivity via the network;
obtaining, by the cellular termination function, cellular policy information and enterprise policy information for the client based on one or more client identifiers;
obtaining, by the cellular termination function, an IP address for the client; and
establishing data plane connectivity for the client with the network via the cellular access point, the first switch of the network, and a second switch of the network based, at least in part, on the IP address and the enterprise policy information for the client, wherein the second switch connects the network with one or more data networks and the data plane connectivity for the client includes an access tunnel provided between the cellular access point and the first switch.

17. The media of claim 16, wherein establishing data plane connectivity for the client further comprises:
creating, by the first switch, the access tunnel between the first switch and the cellular access point, wherein the access tunnel is a Virtual Extensible Local Area Network (VXLAN) tunnel.

18. The media of claim 16, wherein establishing data plane connectivity for the client further comprises:
obtaining, by the cellular access point, an indicator associated with an air interface connection between the cellular access point and the client; and
maintaining, by the cellular access point, a mapping between at least one of the IP address for the client or a Media Access Control (MAC) address for the client and the indicator.

19. A system comprising:
at least one memory element for storing data; and
at least one processor for executing instructions associated with the data, wherein executing the instructions causes the system to perform operations, comprising:
registering, via a cellular termination function, a cellular access point in a network, wherein the registering is based on a Media Access Control (MAC) address and an Internet Protocol (IP) address for the cellular access point and the cellular access point is in communication with a first switch of the network;
obtaining, by the cellular termination function via the cellular access point, a request from a client for data plane connectivity via the network;
obtaining, by the cellular termination function, cellular policy information and enterprise policy information for the client based on one or more client identifiers;
obtaining, by the cellular termination function, an IP address for the client; and
establishing data plane connectivity for the client with the network via the cellular access point, the first switch of the network, and a second switch of the network based, at least in part, on the IP address and the enterprise policy information for the client, wherein the second switch connects the network with one or more data networks and the data plane connectivity for the client includes an access tunnel provided between the cellular access point and the first switch.

20. The system of claim 19, wherein establishing data plane connectivity for the client further comprises:
obtaining, by the cellular access point, an indicator associated with an air interface connection between the cellular access point and the client; and
maintaining, by the cellular access point, a mapping between at least one of the IP address for the client or a Media Access Control (MAC) address for the client and the indicator.

* * * * *